United States Patent
Banerjee et al.

(10) Patent No.: US 12,082,534 B2
(45) Date of Patent: Sep. 10, 2024

(54) MECHANISM AND METHODS FOR ROBOTIC INSTALLATION OF STAKES

(71) Applicant: UNIVERSITY OF SOUTH CAROLINA, Columbia, SC (US)

(72) Inventors: Sourav Banerjee, Irmo, SC (US); Corey Leydig, Irmo, SC (US)

(73) Assignee: UNIVERSITY OF SOUTH CAROLINA, Columbia, SC (US)

( * ) Notice: Subject to any disclaimer, the term of this patent is extended or adjusted under 35 U.S.C. 154(b) by 0 days.

(21) Appl. No.: 18/101,168

(22) Filed: Jan. 25, 2023

(65) Prior Publication Data

US 2023/0292679 A1  Sep. 21, 2023

Related U.S. Application Data

(60) Provisional application No. 63/303,346, filed on Jan. 26, 2022.

(51) Int. Cl.
  *A01G 17/16* (2006.01)
  *B25J 9/16* (2006.01)
  *B25J 11/00* (2006.01)

(52) U.S. Cl.
  CPC .............. *A01G 17/16* (2013.01); *B25J 9/162* (2013.01); *B25J 11/00* (2013.01)

(58) Field of Classification Search
  CPC .......... A01G 17/16; B25J 11/00; B25J 9/1623
  See application file for complete search history.

(56) References Cited

U.S. PATENT DOCUMENTS

| | | | | |
|---|---|---|---|---|
| 4,263,972 A | * | 4/1981 | Johnson | A01G 17/16 171/61 |
| 6,857,619 B1 | * | 2/2005 | Jangula | E02F 3/96 254/132 |

FOREIGN PATENT DOCUMENTS

WO   WO-0204769 A1 * 1/2002 ............. A01G 17/16

* cited by examiner

*Primary Examiner* — Nathaniel C Chukwurah
(74) *Attorney, Agent, or Firm* — DORITY & MANNING, P.A.

(57) ABSTRACT

An autonomous all-terrain robot for agricultural industries is designed to install support stakes inground on plant beds while being able to self-navigate. Apparatus and method provide a robot having the ability to perform the actions of navigating between plant beds and to determine a precise location and depth to place each supporting stake. The purpose of the stakes is to support the plants with weak stems. Part of some planting processes require stakes to support a plant as it begins to grow. from a two- or three-week-old plant to a fully mature plant. The presently disclosed subject matter provides a machine that can aid in the planting process of both bell peppers and eggplants and similar crops, used to drive stakes into planting beds. The presently disclosed technology (such as specific robotic device or robot) can work 24/7, weather permitting, while providing an efficient and completely hands-free way to install stakes needed in the planting process.

25 Claims, 20 Drawing Sheets

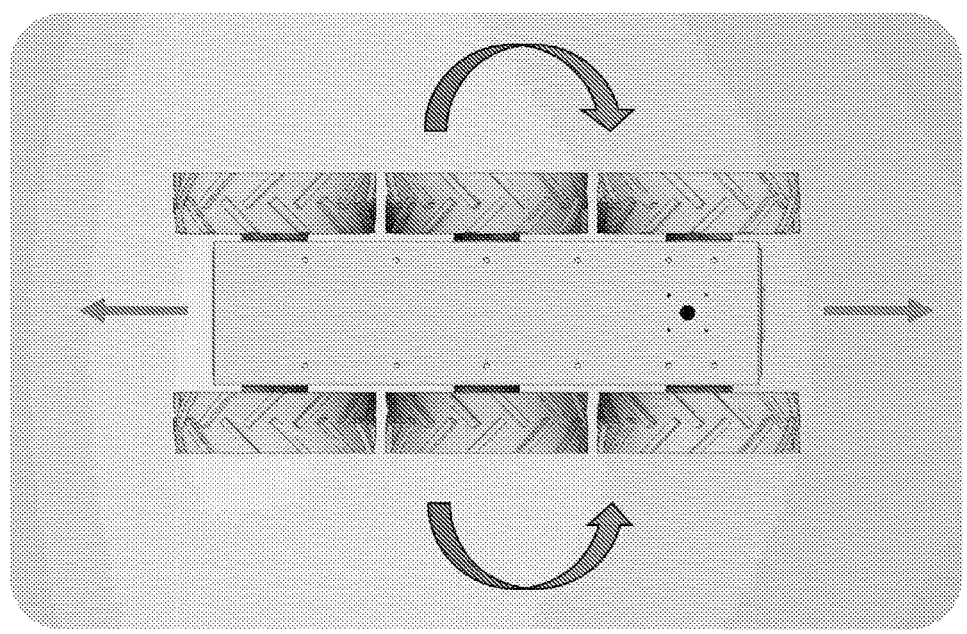
FIG. 5
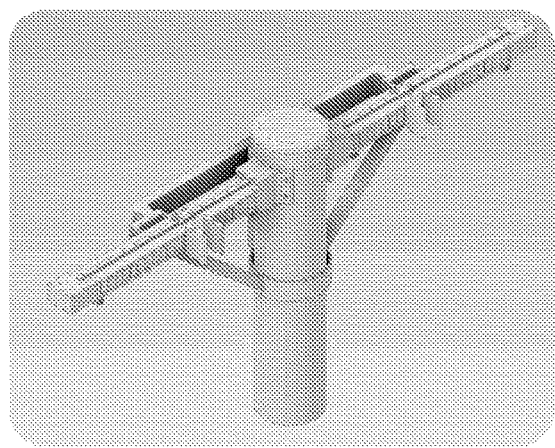 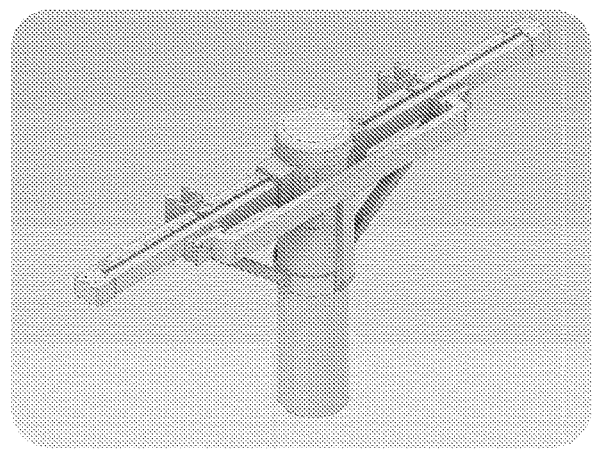
FIG. 6(a)　　　　　　　　　　FIG. 6(b)

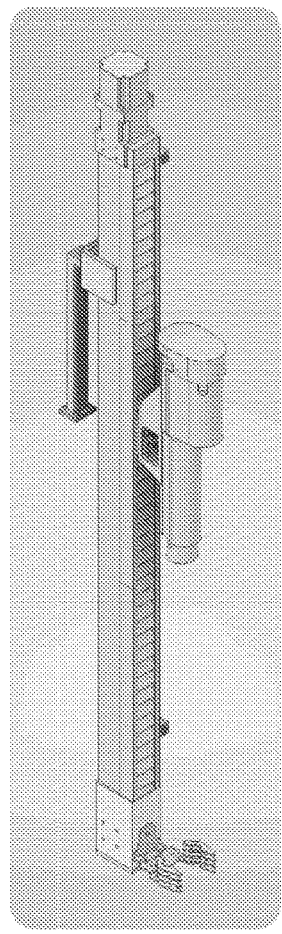 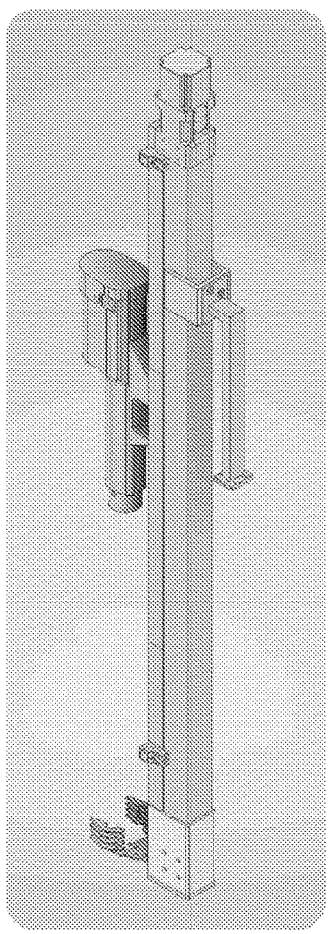
FIG. 11(a)    FIG. 11(b)
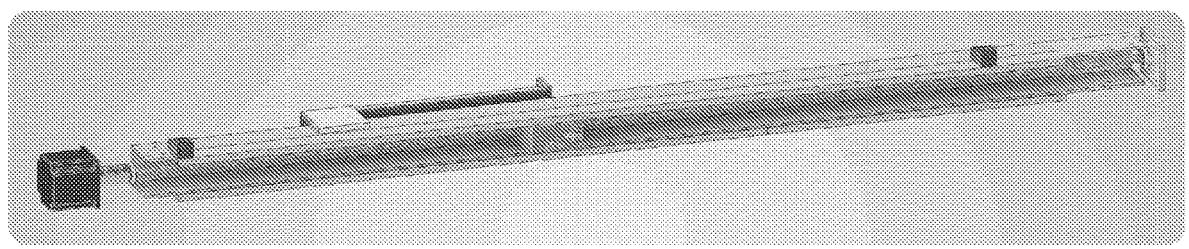
FIG. 12

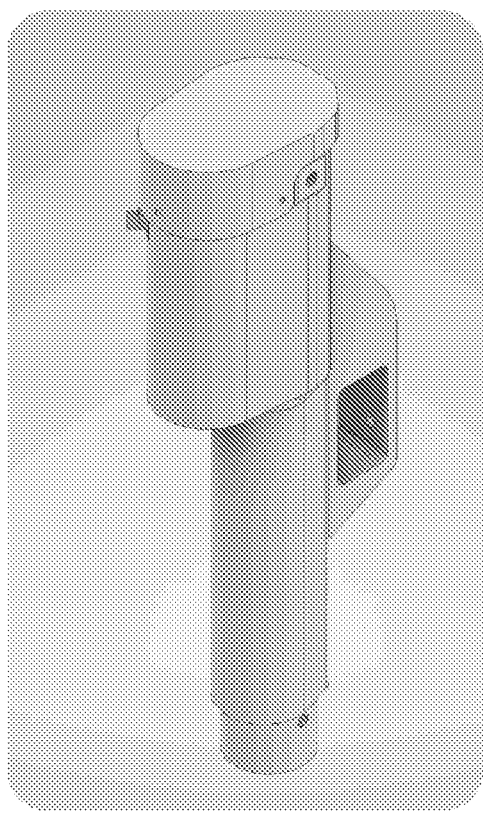 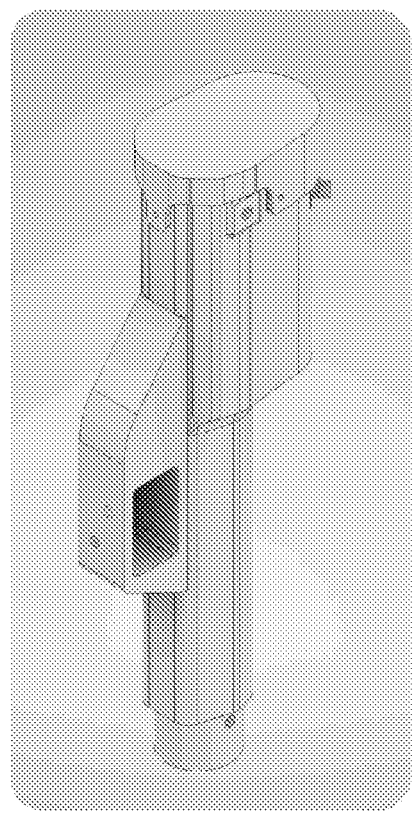
FIG. 13(a)     FIG. 13(b)
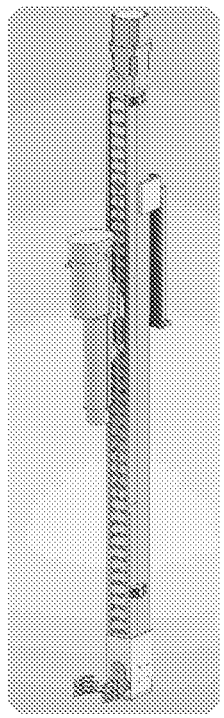
FIG. 13(c)

FIG. 14(a)
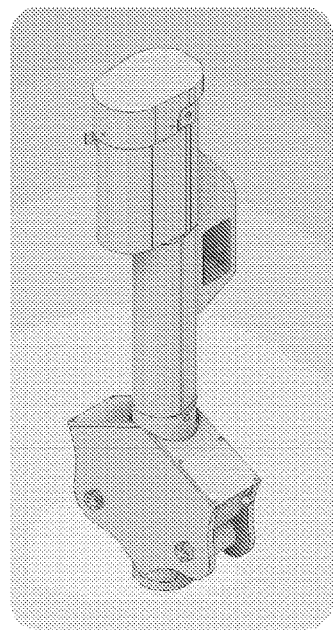
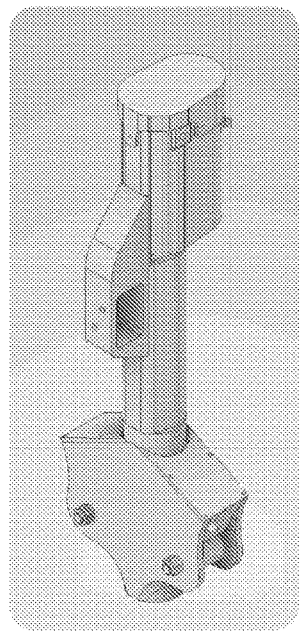
FIG. 14(b)
FIG. 14(c)
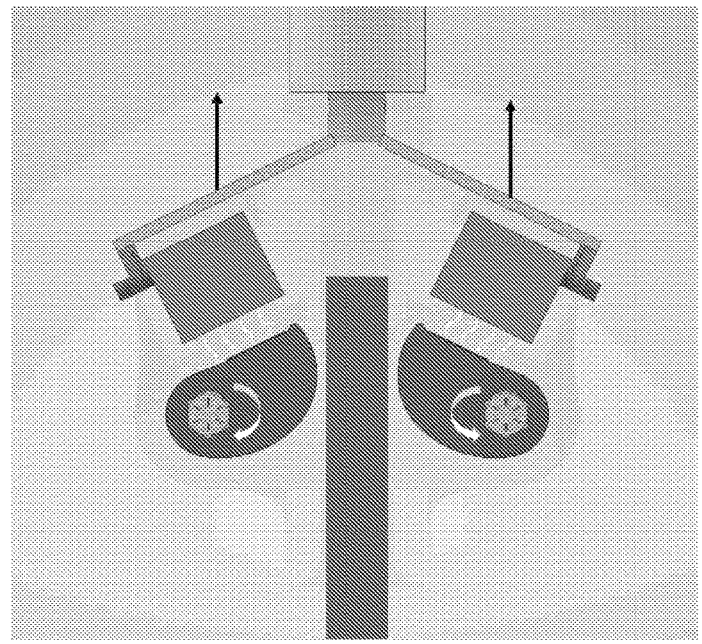

MECHANISM AND METHODS FOR ROBOTIC INSTALLATION OF STAKES

PRIORITY CLAIM

The present application claims the benefit of priority of U.S. Provisional Patent Application No. 63/303,346, titled Mechanism and Methods for Robotic Installation of Stakes, filed Jan. 26, 2022, and which is fully incorporated herein by reference for all purposes.

BACKGROUND OF THE PRESENTLY DISCLOSED SUBJECT MATTER

The presently disclosed subject matter relates to an autonomous all-terrain robot designed for agricultural industries whose purpose is to install support stakes inground on the plant beds while being able to self-navigate.

The disclosure deals with apparatus and method for providing a robot having the ability to perform the actions of navigating between plant beds and to determine a precise location and depth to place each supporting stake. The purpose of the stakes is to support the plants with weak stems.

Currently as part of the bell pepper planting process, stakes are needed to provide support for a plant as it begins to grow from a two- or three-week-old plant to a fully mature plant. The presently disclosed subject matter provides an apparatus which takes control of this tedious step and reduces the overall labor required in the bell pepper planting process. Many, if not all, agricultural companies that specialize in growing bell pepper, egg plants, and any other plants that have weak stems and need support after a few weeks of growth are the potential uses for the presently disclosed technology. Larger-scale companies and growers and many others specialize in growing bell peppers, often with multiple plots and 1000+ acres of land. In the year 2022, the estimated revenue for the agricultural industry is $43.7 billion and is expected to increase by 6% by the end of 2022 according to IBISWorld™.

In general, marketplace demand has asked for a machine that can aid in the planting process of both the bell peppers and eggplants and similar crops. In particular, marketplace demand is looking for an autonomous solution that can be used to drive the stakes into the planting beds, which stakes are needed to help the plants grow.

The presently disclosed technology will lower the cost of labor involved in such as the bell pepper planting process. Implementations of the presently disclosed technology (such as specific robotic device or robot) can work 24/7, weather permitting, while providing an efficient and completely hands-free way to install stakes needed in such as the bell pepper planting process.

As referenced herein, the presently disclosed technology offers a competitive advantage over doing the work manually.

SUMMARY OF THE PRESENTLY DISCLOSED SUBJECT MATTER

Broadly speaking, the present disclosure relates to mechanisms and methods for robotic installation of agricultural stakes. More specifically, the presently disclosed technology relates to systems and apparatuses corresponding and/or associated computer methodology, with the resulting technology providing an autonomous all-terrain robot designed for agricultural industries whose purpose is to install support stakes in plant beds while being able to self-navigate in an agricultural field.

In some embodiments, control of resulting devices (such as a robot) and communications may be managed through an app available for any smart device and primarily communicating through Wi-Fi. Some features may include the ability to self-navigate, to determine if the stake was properly installed or sufficiently driven into the ground, to alert the user of any basic information about the robotic device's operations (e.g., battery life, number of stakes successfully installed, current location, percentage of stakes left onboard the robotic device, etc.).

Stated another way, the presently disclosed robotic device may comprise an autonomous all-terrain robot designed for agricultural industries whose purpose is to install support stakes in plant beds while being able to self-navigate in an agricultural field. Such robot may be associated with an app available on Apple® iOS or Android™ which allows the robot to update the user, for example, on its overall progress. Such robust robotic approach to the central issues provides a complete solution for an overall tedious part of the crop planting process.

More generally, the presently disclosed subject matter broadly relates to technology areas of autonomous operations, involving agricultural endeavors such as stake installation, and crop (for example, bell pepper) planting, including potential use of such as AI and/or robotics technologies.

In one exemplary embodiment disclosed herewith, an autonomous all-terrain robot for agricultural industries for installing support stakes inground on plant beds is described. Such exemplary embodiment may preferably comprise, for example, a base having a plurality of drive wheels for controlled movement of the robot; a main arm mounted on said base and comprising a generally vertical mast with a pair of side arms laterally projecting from the vertical mast in generally opposite directions of each other; a pair of stake driving arms respectively mounted on said side arms for respectively receiving a stake and controllably driving the received stake into the ground; and a reservoir associated with said base for receiving and storing a supply of stakes. In such embodiment, preferably, the side arms include a selectively positioned mount for receiving a respective stake driving arm and for selectively positioning each of the stake driving arms a determined distance from the vertical mast.

It is to be understood that the presently disclosed subject matter equally relates to associated and/or corresponding methodologies. One exemplary such method relates to methodology for an autonomous all-terrain robot for agricultural industries for installing support stakes inground on plant beds. Such exemplary methodology may preferably comprise providing a base having a plurality of drive wheels for controlled movement of the robot, a main arm mounted on said base and comprising a generally vertical mast with a pair of side arms laterally projecting from the vertical mast in generally opposite directions of each other, a pair of stake driving arms respectively mounted on said side arms for respectively receiving a stake and controllably driving the received stake into the ground, and a reservoir associated with the base for receiving and storing a supply of stakes. Further, such method preferably may comprise operating the base to locate the robot in a desired location in an area of plant beds; operating the stake driving arms to obtain stakes from the reservoir; operating the side arms to selectively position each respective stake driving arm a determined distance from the vertical mast; and further operating the stake driving arms to drive the stakes into the ground.

Other example aspects of the present disclosure are directed to systems, apparatus, tangible, non-transitory computer-readable media, user interfaces, memory devices, and electronic devices for ultrafast photovoltaic spectroscopy. To implement methodology and technology herewith, one or more processors may be provided, programmed to perform the steps and functions as called for by the presently disclosed subject matter, as will be understood by those of ordinary skill in the art.

Another exemplary embodiment of presently disclosed subject matter relates to an autonomous all-terrain robot for agricultural industries for selectively installing or removing support stakes inground along plant beds while self-navigating the plant beds. Such exemplary robot preferably may comprise a base having a plurality of drive wheels for controlled movement of the robot; a main arm, mounted on said base, comprising a vertical mast, and a pair of side arms laterally projecting in opposite directions from the vertical mast; a pair of stake handling arms respectively mounted on said side arms for respectively and controllably handling a stake relative to the ground; a stake holster associated with said base for receiving and storing a supply of stakes in respective storage channels thereof; a pair of movable mounts associated with each respective side arm for receiving a respective stake handling arm and for selectively positioning each of the stake handling arms a determined distance from the vertical mast; and a control system for said robot. Such control system may preferably comprise one or more processors programmed for controlling operation of the base, the side arms, the movable mounts, and the stake handling arms of the robot in order to self-navigate the robot, and either of (a) drive stakes into the ground or (b) pull stakes from the ground at selected locations.

Additional objects and advantages of the presently disclosed subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments, uses, and practices of the presently disclosed subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the presently disclosed subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the presently disclosed subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification, and will appreciate that the presently disclosed subject matter applies equally to corresponding methodologies as associated with practice of any of the present exemplary devices, and vice versa.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which:

FIG. 5 illustrates a top elevational view of the subject matter of FIG. 4(a), with additional arrows illustrated to represent movement and turning abilities of the supporting base;

FIGS. 6(a) and 6(b) illustrate respective front and back isometric views focused on an upper mast portion of the exemplary embodiment of FIG. 3(a);

FIGS. 11(a) and 11(b) illustrate respective front and back isometric views focused on a stake driving arm portion of the exemplary embodiment of FIG. 3(a);

FIG. 12 illustrates an isometric view of the exemplary stake driving arm portion of the exemplary embodiment of FIG. 3(a) as shown in FIGS. 11(a) and 11(b), and further illustrating an inside view and various inside features thereof;

FIGS. 13(a) and 13(b) illustrate respective front and back isometric views focused on a stake driver attachment portion for use such as with the exemplary embodiment of FIG. 3(a);

FIG. 13(c) illustrates an isometric view of the exemplary stake driving arm portion and stake driver attachment portion of the exemplary embodiment of FIG. 3(a), and further representing functionality thereof as illustrated by added double-headed arrow illustrations;

FIGS. 14(a) and 14(b) illustrate respective front and back isometric views focused on a stake pulling attachment portion for use such as with the exemplary embodiment of FIG. 3(a);

FIG. 14(c) illustrates a cross-section view focused on a stake pulling attachment portion as shown in FIGS. 14(a) and 14(b), for use such as with the exemplary embodiment of FIG. 3(a);

Figure 1A:
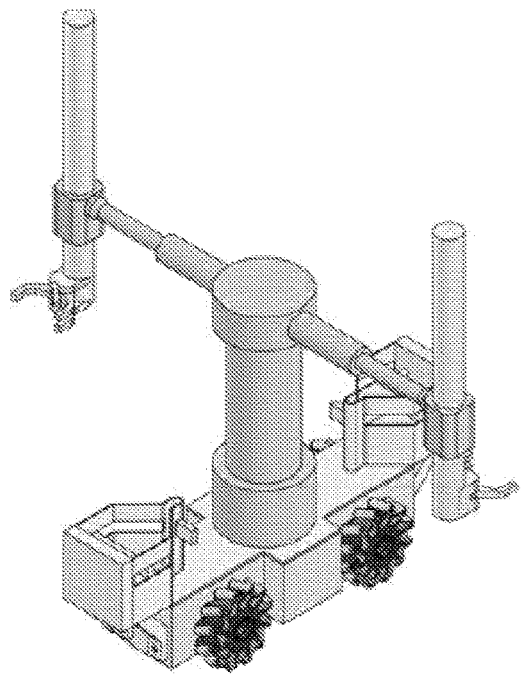
FIG. 1(a) illustrates an isometric view of an exemplary four-wheel embodiment of a presently disclosed robotic device in accordance with presently disclosed subject matter.

Repeat use of reference characters in the present specification and drawings is intended to represent the same or analogous features, elements, or steps of the presently disclosed subject matter.

DETAILED DESCRIPTION OF THE PRESENTLY DISCLOSED SUBJECT MATTER

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

In general, the presently disclosed subject matter relates to an autonomous all-terrain robot designed for agricultural industries. The purpose of the robot is to install support stakes inground on plant beds while also being able to self-navigate among the plant beds.

More particularly, the disclosure deals with apparatus and method for providing a robot having the ability to perform the actions of navigating between plant beds and to determine a precise location and depth to place each supporting stake. The purpose of the stakes is to support the plants with weak stems.

FIGS. 1(a) through 2(e) illustrate representations of an exemplary four-wheel embodiment of a presently disclosed robotic device in accordance with presently disclosed subject matter. In particular, FIG. 1(a) illustrates an isometric view of such exemplary four-wheel embodiment. Further, the representations of FIGS. 1(b) through 1(e) include numeric subject matter which are exemplary dimensions, set forth in inches.

Figure 1B:
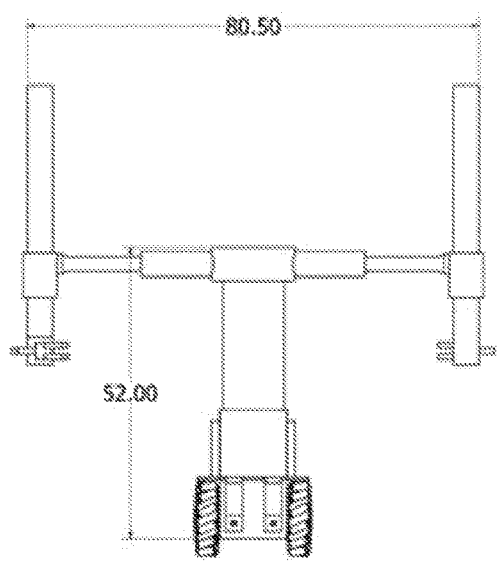
FIGS. 1(b) and 1(c) illustrate one end and top elevation views, respectively, of the exemplary embodiment of FIG. 1(a)
Figure 1C:
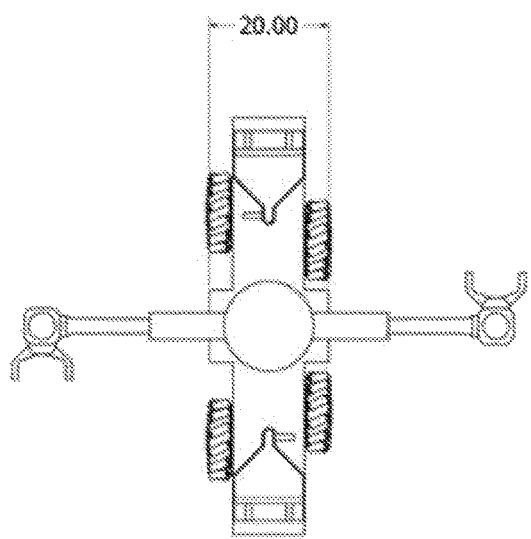

FIGS. 1(b) and 1(c) illustrate one end and top elevation views, respectively, of the exemplary embodiment of FIG. 1(a). They show four wheels mounted on a base from which rises a central mast. The central mast supports a balanced pair of main arms protruding from the central mast from opposite sides thereof. Each main arm supports a driving arm. The central mast and the driving arms are in a vertical position relative to the base and the ground on which the wheels traverse. The main arms are horizontal to such base and the ground, and interconnect the mast with the driving arms.

Figure 1D:
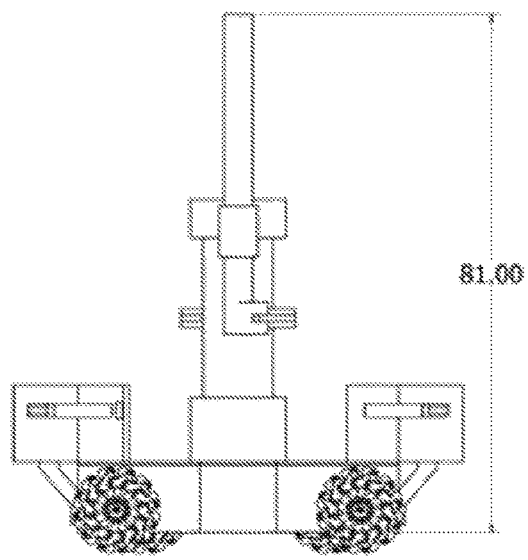
FIGS. 1(d) and 1(e) illustrate respective opposite side elevation views of the exemplary embodiment of FIG. 1(a)
Figure 1E:
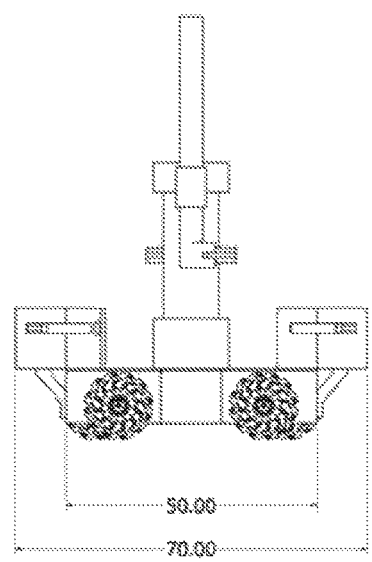
Figure 1F:
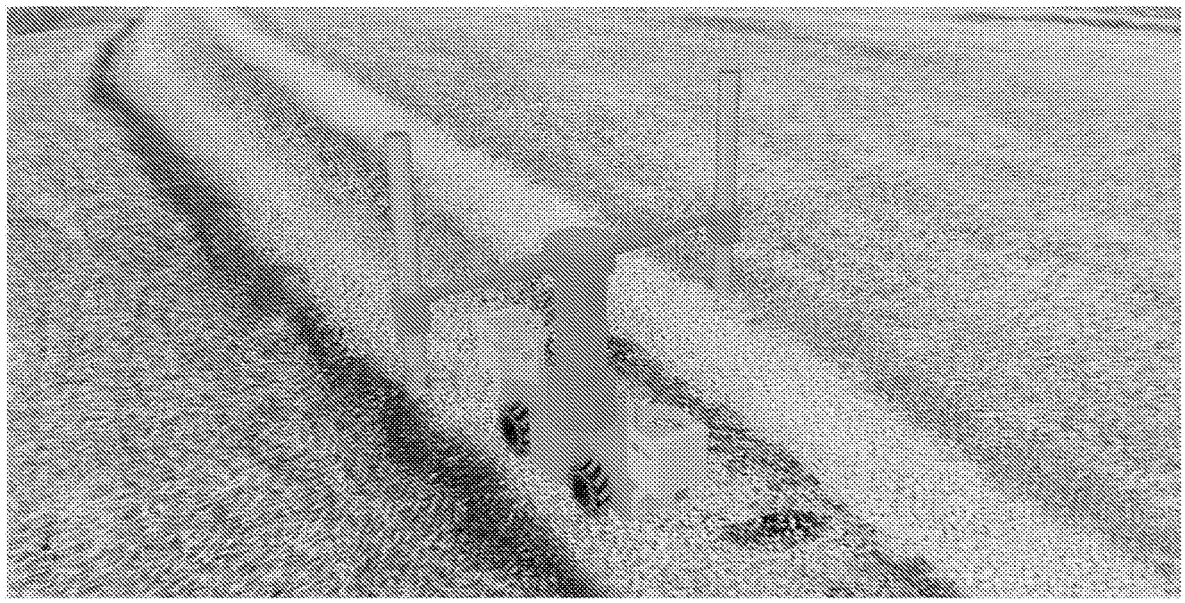
FIG. 1(f) illustrates an isometric view of the exemplary embodiment of FIG. 1(a), positioned for use relative to representative exemplary plant beds.

FIGS. 1(d) and 1(e) illustrate respective opposite side elevation views of the exemplary embodiment of FIG. 1(a). They show that a pair of wheels on one side may be more separated from each other than the pairs of wheels on the other side, to facilitate turning. The tires may include large treads, similar to tractor tires, for traversing agricultural-related terrains. For example, FIG. 1(f) illustrates an isometric view of the exemplary embodiment of FIG. 1(a), positioned for use relative to representative exemplary plant beds. Table 1 below shows some exemplary dimensions and specifications which could be practiced for some circumstances, such as in providing stake implementations for either of bell pepper or eggplant plantings. With such Table 1 set of specifications, about 2700 stakes are utilized per acre for both types of crops.

TABLE 1

| Constraints: | Bell Peppers: | Eggplants: |
|---|---|---|
| Height of the bed plots | 8 inches | 8 inches |
| Width of the bed plots | 32 inches | 32 inches |
| Width between each bed plot | 22 inches | 22 inches |
| Distance the stake is to be driven into the ground | 12 inches | 12 inches |
| Distance between each stake | 96 inches | 40" and then 54" this pattern repeats |
| Notes: | Stakes are 29" total length Plant spacing-12" | stakes are 56" total length Plant spacing-19" |

The FIG. 1(a) embodiments and others disclosed herewith includes various advantageous features. For example, the robotic devices may be readily outfit for autonomous driving (that is, self-navigation). The design inherently allows for simultaneous installation of two stakes at a time on two plant beds on either side of the central mast. Such an approach inherently balances lateral forces otherwise acting on the robotic device. The hands (such as electric grippers) for grabbing stakes can be self-movable (moved by the robotic device itself) to adjust the distance between the stakes following the distance between the plant beds. The stake driving arms may be self-movable (moved by the robotic device itself) to move to a location to pick the stakes from a storage and subsequently drive them into the ground after being moved to a desired location. Since the robotic device's main purpose is to drive stakes into the ground, a force sensor may be incorporated into the robotic device to help guide and adjust the driving force used, for proper installation.

Figure 2A:
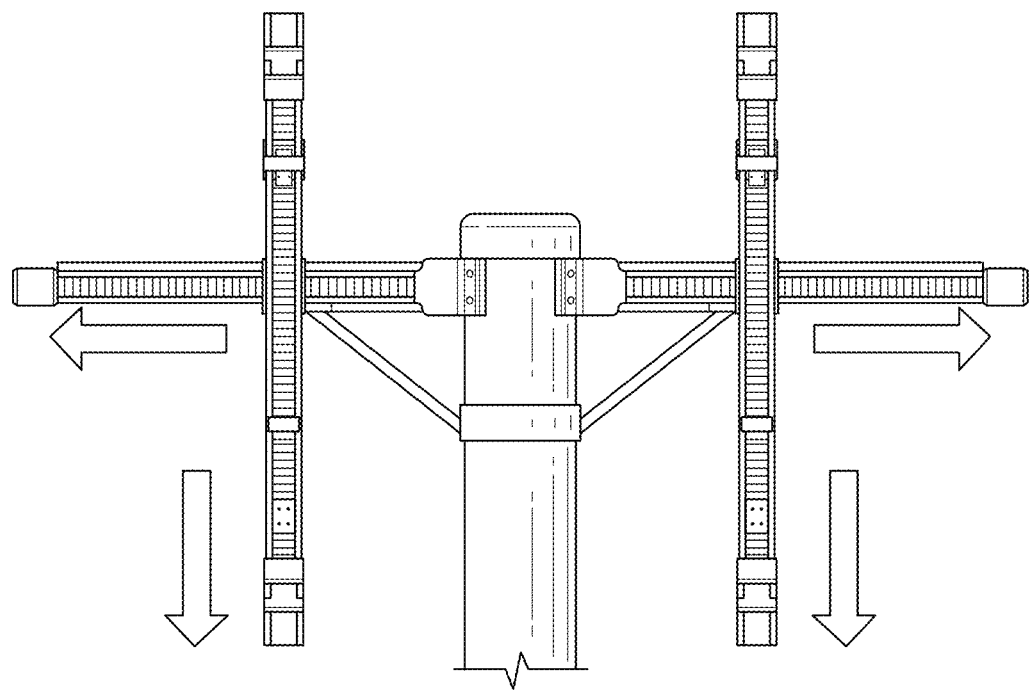
FIG. 2(a) illustrates an enlarged front elevation view of a presently disclosed exemplary embodiment, focused on an upper mast portion thereof, and representing various movable features thereof as shown by plural arrows.

FIG. 2(a) illustrates an enlarged front elevation view of a presently disclosed exemplary embodiment, focused on an upper mast portion thereof, and representing various movable features thereof as shown by plural arrows. In particular, the arrows pointing left and right signify that each driving arm may be moved along main arm portion, at a selected distance from the central mast. In some embodiments, preferably each driving arm may be moved the same distance from the central mast for best balanced operations, particularly whenever the track (driving path) of the robotic device is centrally located relative to the location of where stakes are to be placed. The downward pointing arrows each signify driving of the stakes into the ground.

Figure 2B:
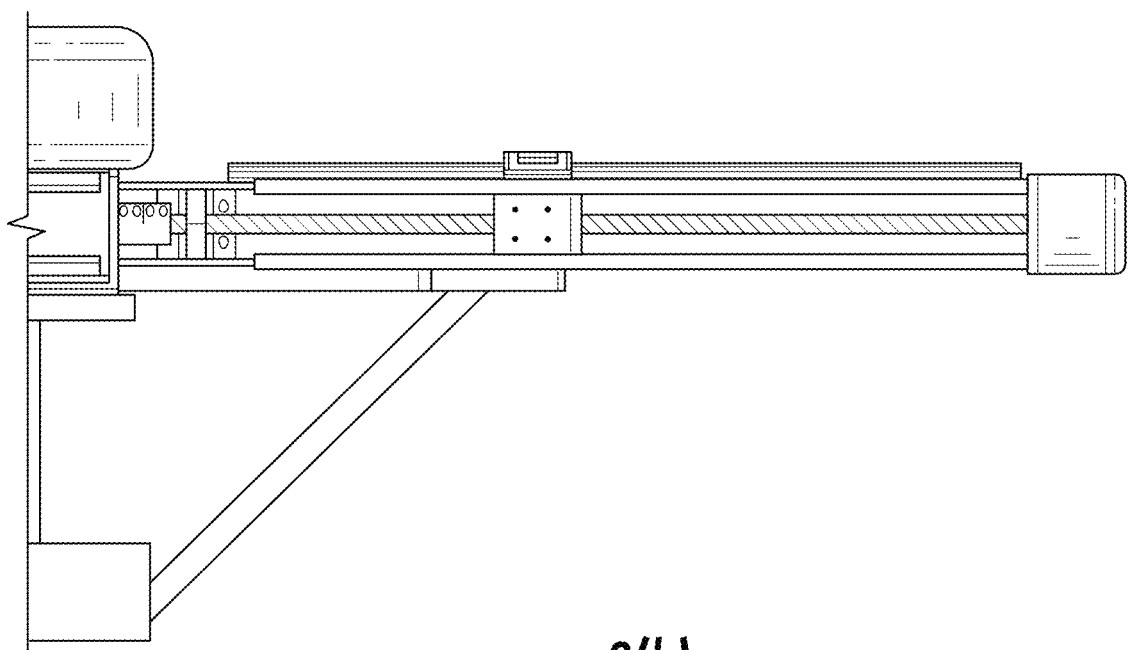
FIG. 2(b) illustrates an elevation view of a further enlarged portion of an isolated exemplary aspect of the subject matter of FIG. 2(a), illustrating certain internal movement features thereof along with diagonal support features thereof.
Figure 2C:
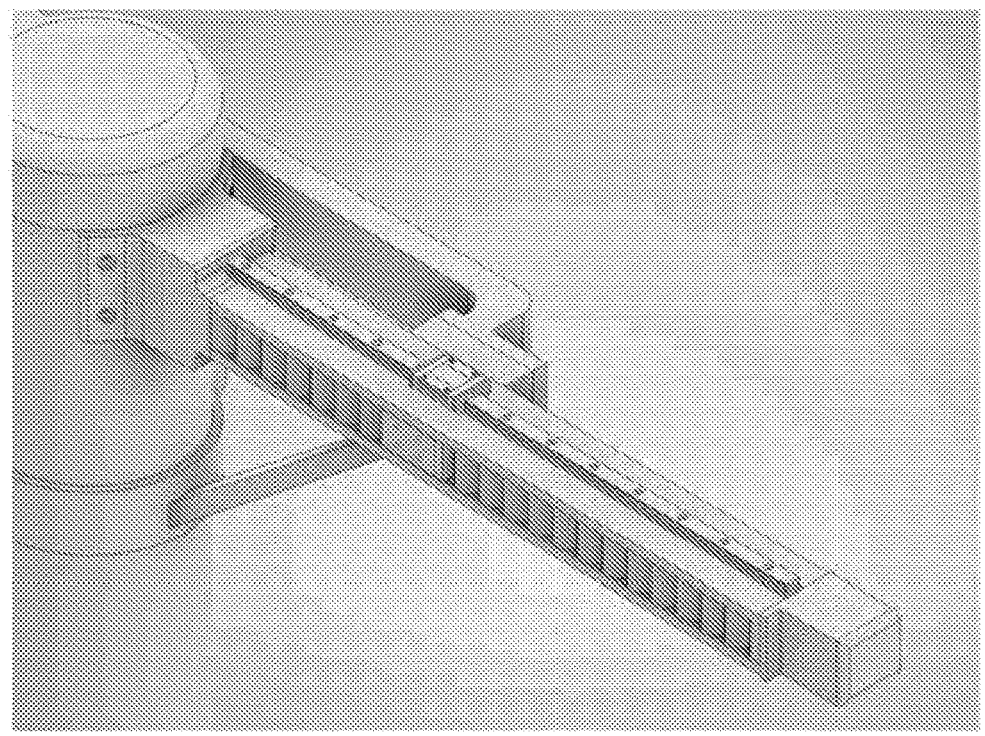
FIG. 2(c) illustrates an isometric view of a portion of illustrated features of FIG. 2(b)

FIG. 2(b) illustrates an elevation view of a further enlarged portion of an isolated exemplary aspect of the subject matter of FIG. 2(a), illustrating certain internal movement features thereof along with diagonal support features thereof. In particular, details of the opposite side corresponding features of the robotic device are the same but reversed in appearance. For example, a diagonal support may extend upward at an angle from the central mast until contacting and supporting the extended main arm. The illustration of FIG. 2(b) also represents internal features thereof, such as drive screw controllably turning within the main arm, to position the driving arm in a desired position along the main arm, as will be understood by those of ordinary skill in the art without requiring additional detailed explanation. FIG. 2(c) illustrates an isometric view of a portion of illustrated features of FIG. 2(b), and particularly illustrating additional mounting features of how each main arm is connected to the central mast.

Figure 2D:
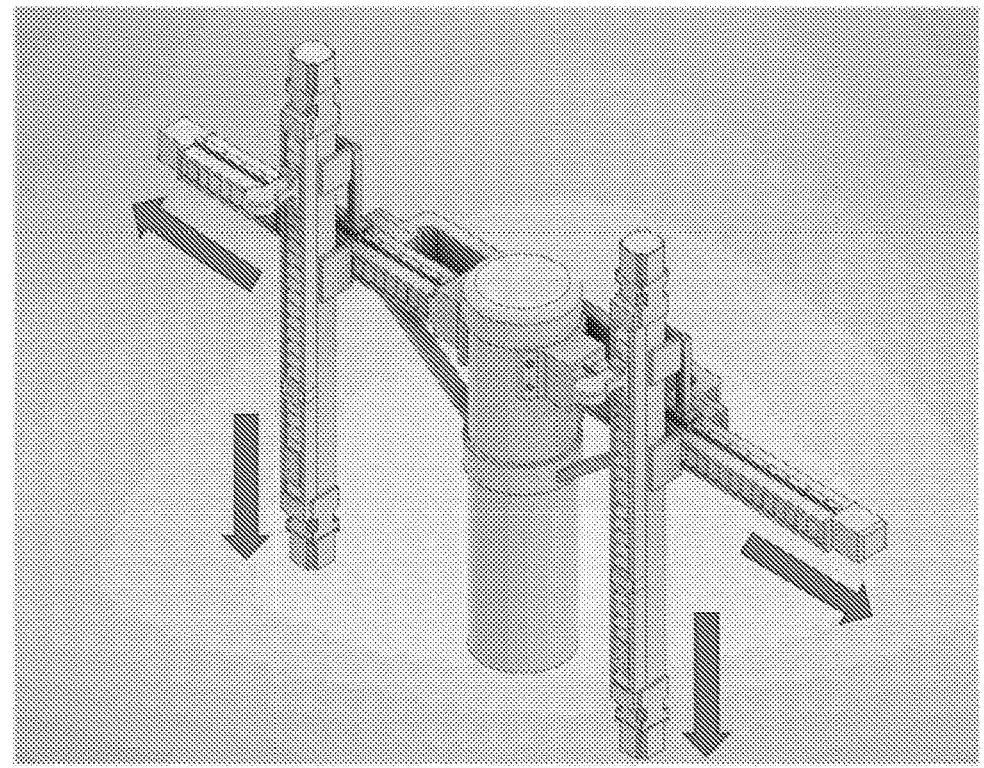
FIG. 2(d) illustrates an isometric view of the illustrated features of FIG. 2(a)

FIG. 2(d) illustrates an isometric view of the illustrated features of FIG. 2(a). Four directional arrows are illustrated (similar to the illustration of FIG. 2(a)), for signifying that each driving arm may be moved along main arm portion, at a selected distance from the central mast, while the downward pointing arrows each signify driving of the stakes into the ground.

Figure 2E:
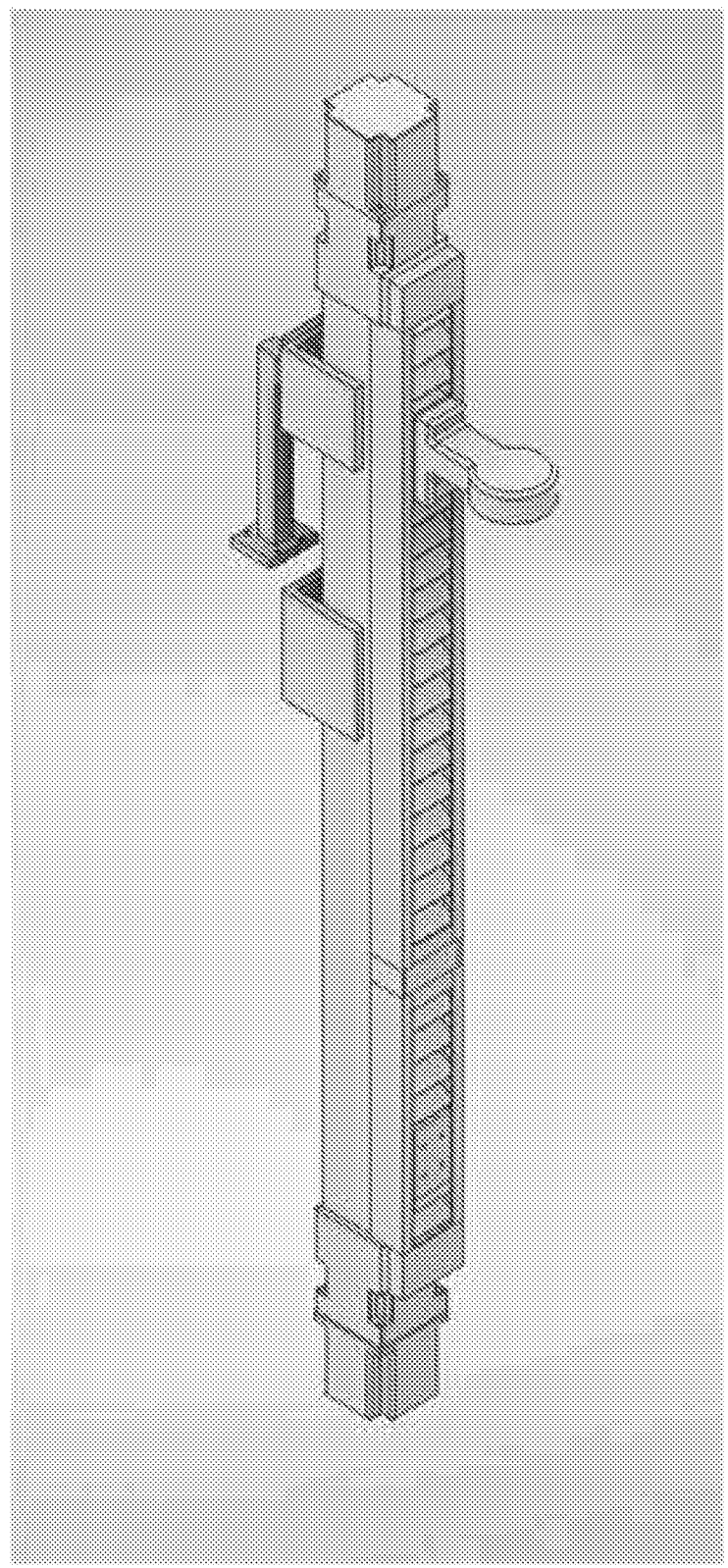
FIG. 2(e) illustrates an isometric view of a further enlarged portion of an isolated exemplary aspect of the subject matter of FIG. 2(a), illustrating certain stake driving features thereof.

FIG. 2(e) illustrates an isometric view of a further enlarged portion of an isolated exemplary aspect of the subject matter of FIG. 2(a), illustrating certain stake driving features thereof. As understood from the complete disclosure herewith, the forwarding extending short arm is vertically movable along the stake driving arm. Thus, such forwarding extending short arm engages the tops of a stake which is placed in parallel position to the stake driving arm, so that controlled lowering of the forwarding extending short arm controllably drives the stake into the ground.

Figure 3A:
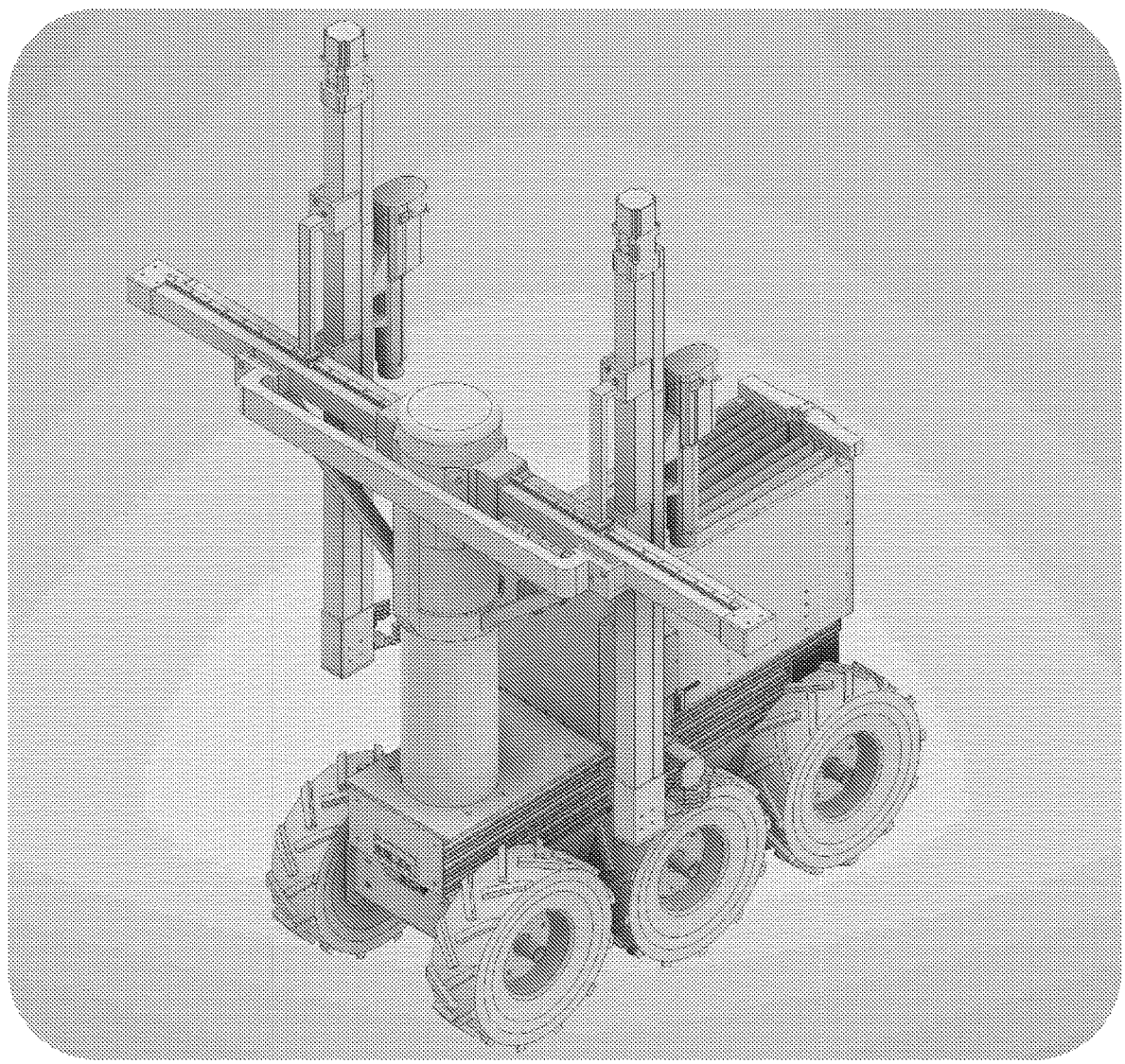
FIG. 3(a) illustrates an isometric view of an exemplary six-wheel embodiment of a presently disclosed robotic device in accordance with presently disclosed subject matter.

FIG. 3(a) illustrates an isometric view of an exemplary six-wheel embodiment of a presently disclosed robotic device in accordance with presently disclosed subject matter. Similarly, FIG. 3(b) illustrates an isometric view of the exemplary embodiment of FIG. 3(a), but shown as positioned for use relative to representative exemplary plant beds.

As shown, the subject robotic device preferably comprises a fully autonomous robotic vehicle that is capable of driving and retrieving support stakes from the bed plots of any agricultural field or farm. Such steps (driving/placing and subsequently retrieving stakes) is important for the planting process of most plants. As the plant begins to grow, it becomes susceptible to its own weight and in many cases can break away from its main stem and die if not supported properly. Alternatively, weight can because the plant to become undesirably damaged/misshaped even if the plant product does not fully break away from its main stem. Depending on the size of the farm, this process of planting and retrieving the stakes can become very labor intensive and certain companies have already begun to look towards automation.

The presently disclosed robotic device works by first retrieving the stakes from the holster which sits on the back of the robotic device. Thus, the holster serves as a reservoir or supply of stakes. Then, the arms move to retrieve the stakes, the grippers will grab the stake from the holster, and then the stake driving arm will lower overtop of the stake. Once the stake is grabbed, the main arm will position the stake overtop the desired area over the bed plot and then the stake driving arm will drive the stake into the ground. After the stake is properly inserted into the ground, the robotic device will drive to the next location and the process repeats.

Figure 3B:
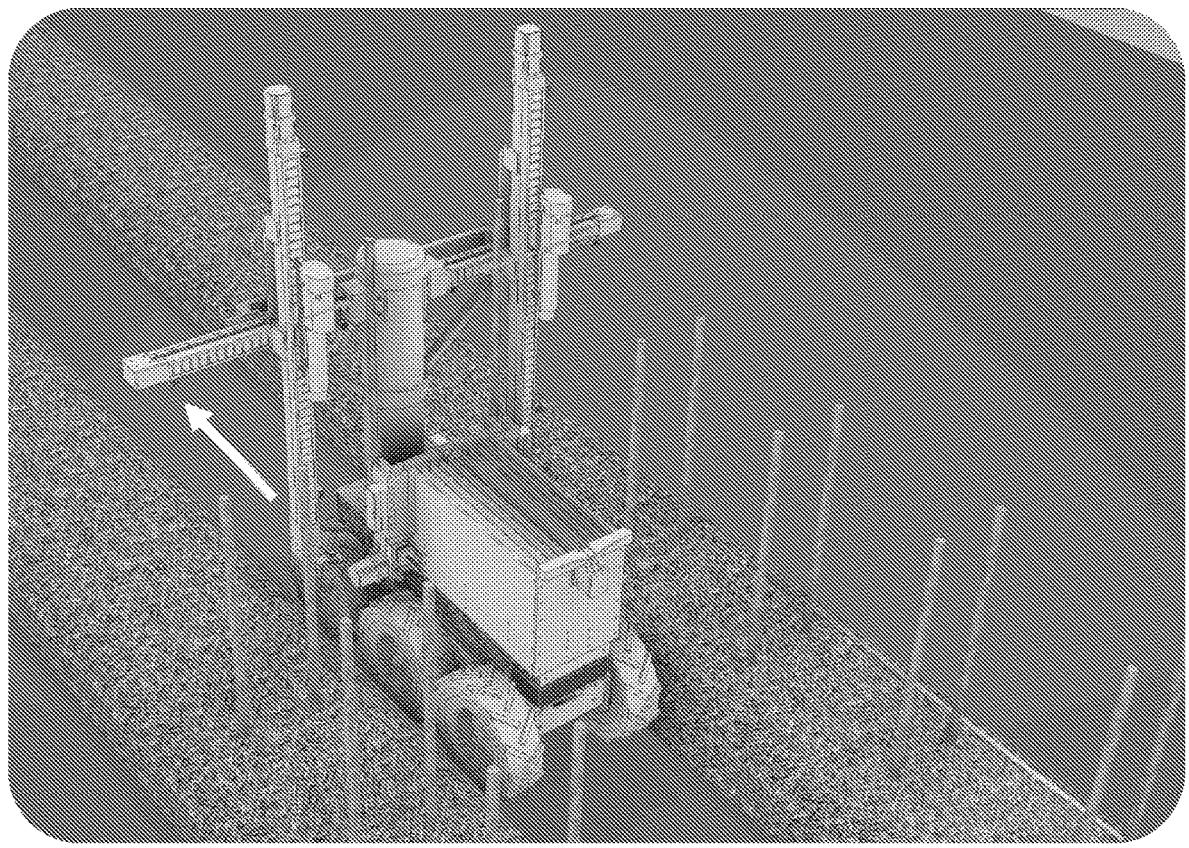
FIG. 3(b) illustrates an isometric view of the exemplary embodiment of FIG. 3(a), positioned for use relative to representative exemplary plant beds.

As illustrated in FIG. 3(b), the stakes are pushed to or towards a pickup location, represented by an arrow in a holster area of the robotic device. The main arms move to such pickup location, as represented by the laterally-positioned double-headed arrows along each horizontal main arm. The stakes are grabbed and then the driving arms are moved horizontally out (from the main mast) over top of the bed plot. Once properly positioned overtop of the bed plot, they are driven into the ground (as represented by the vertical double-headed arrows along each respective driving arm. Thereafter, the robotic device advances along the bed plot to a next position, in the direction of the illustrated ground arrow.

Figure 4A:
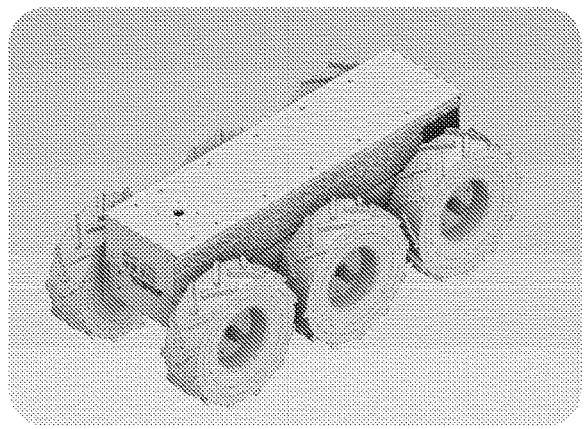
FIGS. 4(a) and 4(b) illustrate isometric views from left and right sides, respectively, of supporting base features of the exemplary embodiment of FIG. 3(a)
Figure 4B:
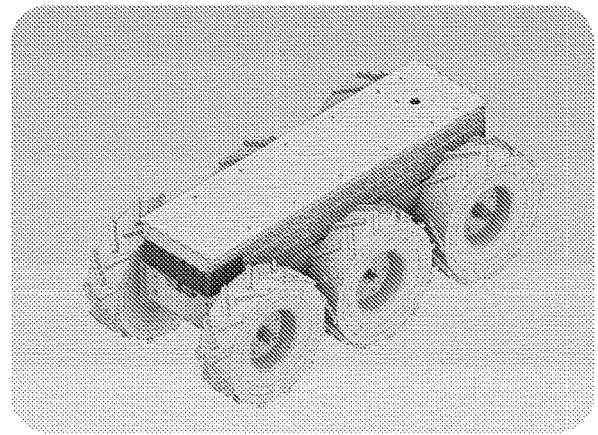
Figure 4C:
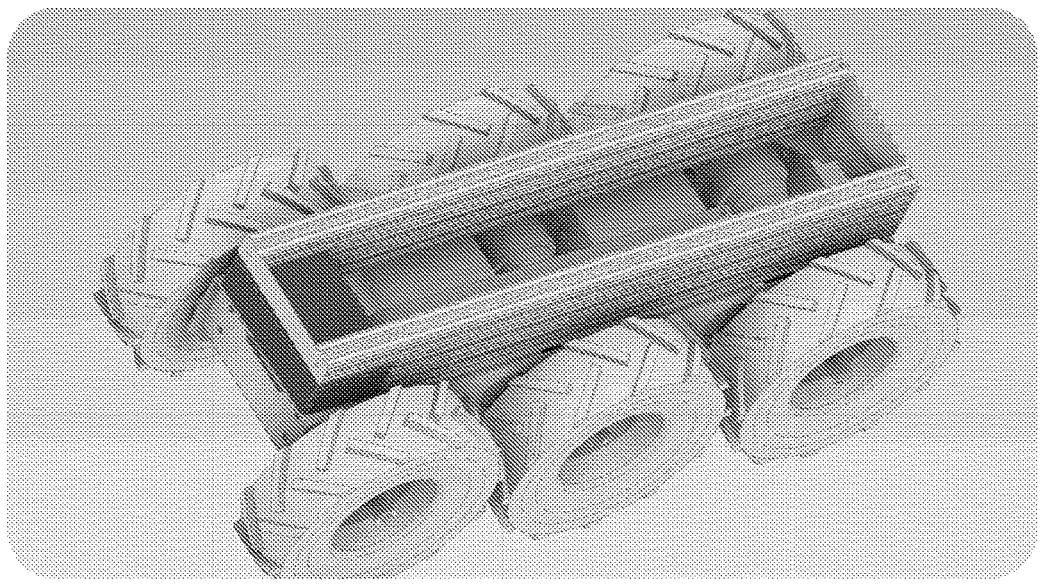
FIG. 4(c) illustrates a further isometric view of the subject matter of FIG. 4(a), with an internal mounting area of the supporting base exposed.

FIGS. 4(a) and 4(b) illustrate isometric views from left and right sides, respectively, of supporting base features of the exemplary embodiment of FIG. 3(a). FIG. 4(c) illustrates a further isometric view of the subject matter of FIG. 4(a), with an internal mounting area of the supporting base exposed. Per the exemplary embodiment of FIG. 3(a), the presently disclosed robotic device may have a base which includes 6-wheeled drive, rubber trailer ties, designed for all terrain. The base may also house the electronics within the base itself. These may include both inside an electrical box and on shelves that slide inside the base. For example, clear acrylic shelves may be used for visibility in arranging electrical components, including wiring. There may be various batteries for use, such as two lithium-ion batteries, housed underneath the electronics, and positioned for example near the bottom most half of the base.

When the electronic housing is sealed, it renders the vehicle water-resistant. All exterior parts of the base made be made from durable materials, and in one example may be made from a metal such as aluminum. The electrical box and the acrylic shelves are made of different, preferably non-conductive materials. The base may also have Lidar/RGB camera sensor technology incorporated on the front to allow the robot to self-navigate.

FIG. 5 illustrates a top elevational view of the subject matter of FIG. 4(a), with additional arrows illustrated to represent movement and turning abilities of the supporting base. As shown by such arrows, the robotic device may move forwards, backwards, and/or rotate left or right. It is driven either remotely by a user such as from an associated app or automatically by an on-board AI system. The robotic device may also incorporate has speed control and obstacle avoidance to protect it from crashes whether operated from user controls or by the AI system.

FIGS. 6(a) and 6(b) illustrate respective front and back isometric views focused on an upper mast portion of the exemplary embodiment of FIG. 3(a). The main body or mast of the robotic device includes two side arms or holders that move outward and inward along the main arms to allow the robotic device driving arms to maneuver overtop of the plant beds. Such functionality (otherwise discussed herein) allows the stakes to be placed accordingly. Such pair of main arms are supported by respective braces that allow for stronger support, especially while the robotic device is in motion. Such braces are attached from the main arms to the main body cylinder (or mast).

Figure 7A:
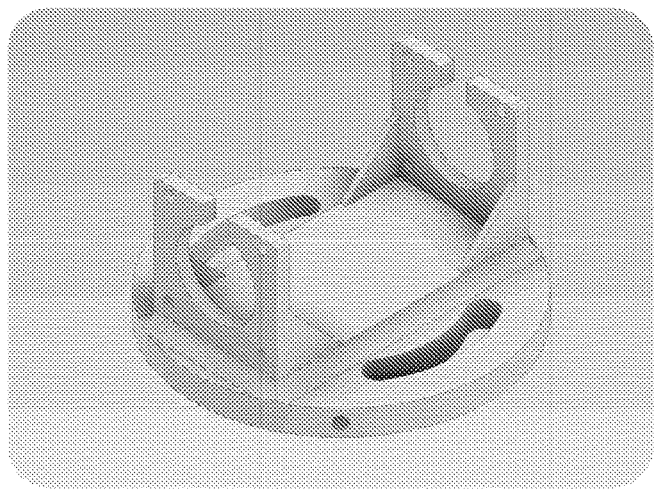
FIG. 7(a) illustrates an isometric view of an exemplary main body motor mount for the exemplary embodiment of FIG. 3(a)
Figure 7B:
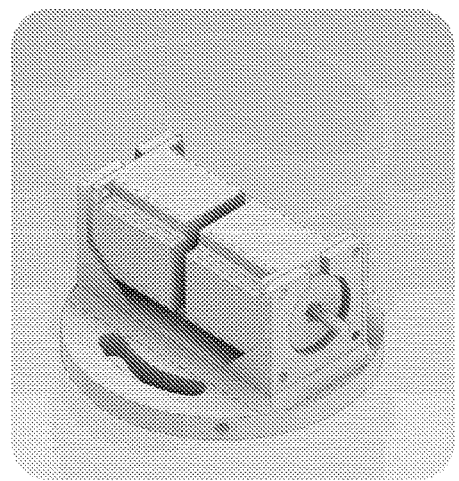
FIG. 7(b) illustrates an isometric view of the exemplary main body motor mount for the exemplary embodiment of FIG. 3(a) as illustrated in FIG. 7(a), further with an exemplary motor mounted therein.

FIG. 7(a) illustrates an isometric view of an exemplary main body motor mount for the exemplary embodiment of FIG. 3(a). FIG. 7(b) illustrates an isometric view of the exemplary main body motor mount for the exemplary embodiment of FIG. 3(a) as illustrated in FIG. 7(a), further with an exemplary motor mounted therein. The main body cylinder or mast houses stepper motors that are used to control the arms and are supported by a custom plate that holds the motors in place and attaches to the inside of the cylinder. Exemplary details are shown in FIGS. 7(a) and 7(b). The cylinder may be made from various durable materials, for example, PVC plastic, while the brace may also be made from strong materials, such as steel.

As further represented by exemplary FIGS. 7(a) and 7(b), the motor mount attaches such as via machine screws from the side wall through the cylinder, and the motors are fastened to the face plates that extrude from the base of the motor mount. Slots may be cut out to allow for wires to extend down to the robotic device's base which houses the electronics. The motor mount may be custom made of various materials, such as made from a 3D printed nylon glass filled (GF) material.

Figure 8A:
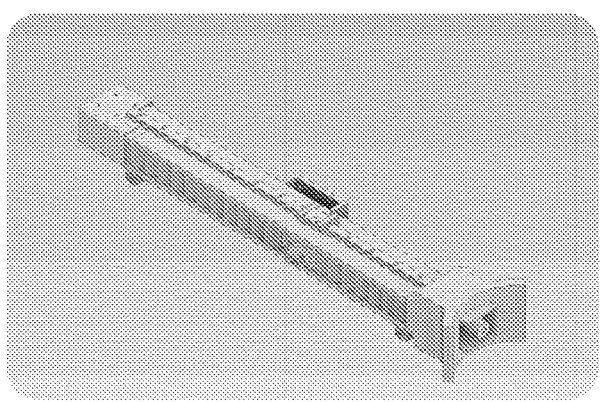
FIGS. 8(a) and 8(b) illustrate respective front and back isometric views focused on a main arm portion of the exemplary embodiment of FIG. 3(a)
Figure 8B:
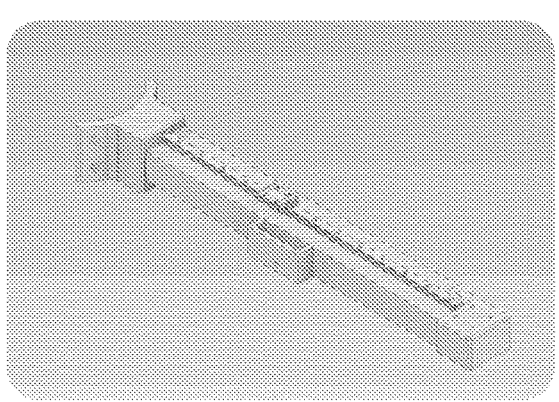

FIGS. 8(a) and 8(b) illustrate respective front and back isometric views focused on a main arm portion of the exemplary embodiment of FIG. 3(a). As shown in FIGS. 6(a) and 6(b), preferably one each of the main arm portions shown in FIGS. 8(a) and 8(b) attach to each opposite side of the main mast or main body cylinder, to project therefrom in a straight line perpendicular to the direction of forward movement of the robotic device.

While variations may be practiced, in the illustrated embodiment associated with FIG. 3(a), the main arm or the robotic device includes components that make up a typical electrical linear actuator with an aluminum C-Channel housing the components. The arm (or paired components of arm portions) allows the robotic device's stake driving arms to move inward and outward from the main base where they can retrieve a stake from the holster and position the driving arm overtop of the bed plot. As shown, the arms attach to the main body by curved respective arm covers that are designed to wrap around the cylindrical shape of the main body. An end cap may be provided, designed to fit over the end of the arms for added protection. While variations may be practiced, in the illustrated representative embodiment, these components are 3D printed such as with nylon GF material.

Figure 9:
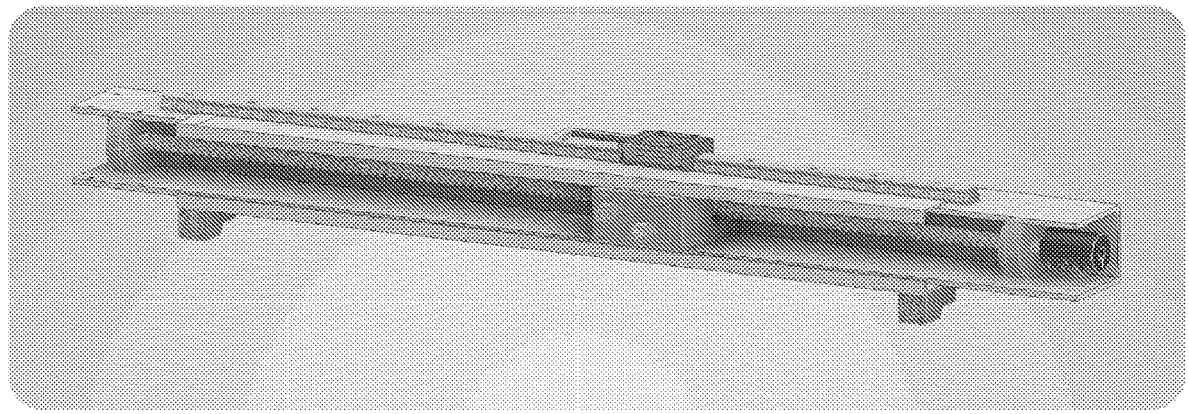
FIG. 9 illustrates an isometric view of the exemplary main arm portion of the exemplary embodiment of FIG. 3(a) as shown in FIGS. 8(a) and 8(b), and further illustrating an inside view and various inside features thereof.

FIG. 9 illustrates an isometric view of the exemplary main arm portion of the exemplary embodiment of FIG. 3(a) as shown in FIGS. 8(a) and 8(b), and further illustrating an inside view and various inside features thereof. In particular, an elongated lead screw is held on each end by lead screw holders, and has a mover element journaled in the screw to be correspondingly moved as it is rotated, as understood by those of ordinary skill in the art without. The mover element cooperates with an elongated slider feature across the top or upper side of the arm. A pair of respective end limit switches may be positioned relative to the lower side of the arm, as shown. At the far right end of FIG. 9, a motor coupling is illustrated by which rotational power is selectively applied to the lead screw.

Per the inner workings of the main arms shown in FIG. 9, and as discussed, the linear actuator-style arms include a lead screw, and the two lead screw holders house ball bearings and the arm mover which pairs with the slider that holds the stake driving arms. The arm mover is restricted between the limit switches and the lead screw directly connects (via the motor coupling) to stepper motors that are housed inside the robotic device's main body. The arm mover has flat bellows on either side that extend and retract with the mover (see FIGS. 8(a) and 10) and keep all the inside components protected. The arm mover and the lead screw holders may be made for example from a 3D printed nylon GF material or other material. The lead screw is a hardened material such as metal, for example stainless steel. The slider track may be similarly a hardened steel, while the rest of the arm components may be a lighter weight metal material, such as aluminum or other.

Figure 10:
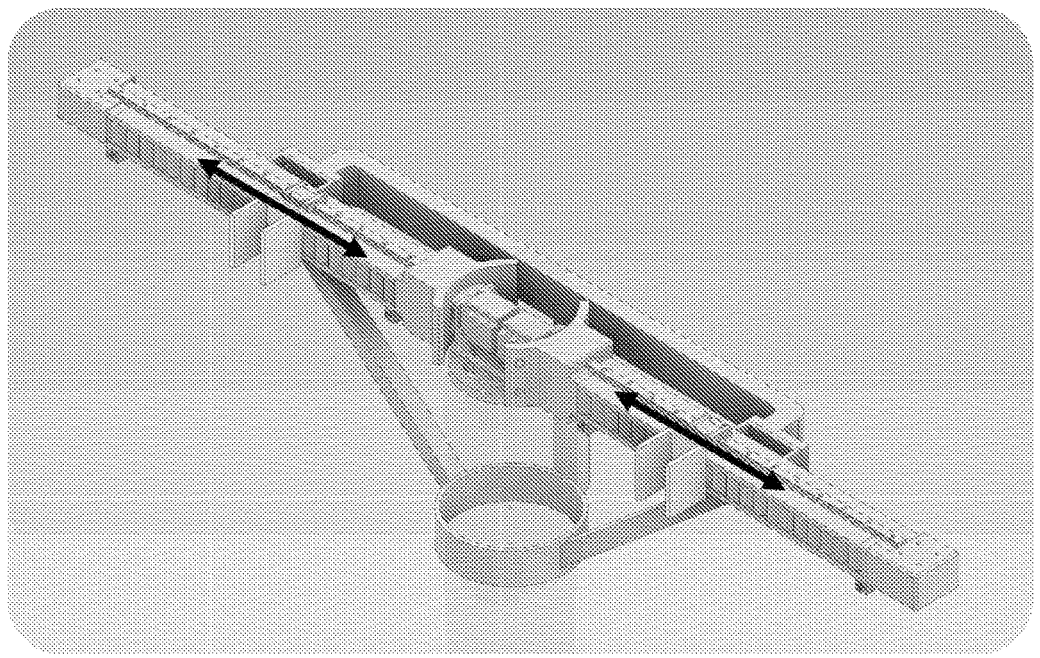
FIG. 10 illustrates an isometric view of the exemplary main arm portion of the exemplary embodiment of FIG. 3(a) as shown in FIGS. 8(a) and 8(b), and further illustrating in phantom a mounting position thereof relative to a mast feature of the exemplary embodiment of FIG. 3(a) and further illustrating double-headed arrows showing various movement features thereof.

FIG. 10 illustrates an isometric view of the exemplary main arm portion of the exemplary embodiment of FIG. 3(a) as shown in FIGS. 8(a) and 8(b). FIG. 10 also further illustrates in phantom a mounting position thereof relative to a mast feature of the exemplary embodiment of FIG. 3(a) and further illustrates double-headed arrows showing various movement features thereof. The robotic device supports two main arms that hold the stake driving arms. As shown, these two arms move laterally, left to right together. Such paired movement helps to keep the robotic device balanced as the arms extend laterally from left to right. The robotic device preferably should be positioned directly between the bed plots in order to place the stake equal distance apart. The robotic device operation by a user or by a self-navigating AI is responsible for keeping such equal distance position as it moves down the bed plot rows.

FIGS. 11(a) and 11(b) illustrate respective front and back isometric views focused on a stake driving arm portion of the exemplary embodiment of FIG. 3(a). The robotic device's stake driving arms are responsible for planting the stake into the bed plots, per functionality as otherwise detailed herein. The arm itself is similar in design to the main arms, in that both are electrical linear actuators controlled by a stepper motor. The stake driving arm is supported by a steel arm attached to its back and has a removeable attachment on the front that the user can change depending on the type of operation needed (driving or retracting/removing a stake). In FIGS. 11(a) and 11(b), the stake driving attachment is shown which is another linear actuator that has an increased torque output allowing for an additional driving force if needed. The arm as illustrated also has an electric gripper used for grabbing and holding the stakes. The components may be made of various sturdy materials, for example, such as mostly made from aluminum and steel. The mover component again may have flat bellows on either side that extend and retract with the mover (see FIG. 11(a)) to keep all the inside components protected.

FIG. 12 illustrates an isometric view of the exemplary stake driving arm portion of the exemplary embodiment of FIG. 3(a) as shown in FIGS. 11(a) and 11(b), and further illustrating an inside view and various inside features thereof. The main components of the inside view of the robotic device stake driving arm are the elongated lead screw, the arm mover, the stepper motor, and the pair of limit switches. Such main components are similar in design to the main arm. Thus, the elongated lead screw is connected to a stepper motor with the arm mover free to move between the bounds of the limit switches. The motor mount and the end cap (where the gripper attaches to) both house ball bearings that support the lead screw. The motor mount and end cap may be made for example from a 3D nylon GF material. Meanwhile, the lead screw may be a relatively more hardened material such as stainless steel, and the rest of the components may be metal such as aluminum.

FIGS. 13(a) and 13(b) illustrate respective front and back isometric views focused on a stake driver attachment portion for use such as with the exemplary embodiment of FIG. 3(a). FIG. 13(c) illustrates an isometric view of the exemplary stake driving arm portion and stake driver attachment portion of the exemplary embodiment of FIG. 3(a), and further representing functionality thereof as illustrated by added double-headed arrow illustrations.

More particularly, the stake driving attachment is used for adding additional driving force during the stake driving operation. The attachment is an electric linear actuator design for around 200 lbs. of additional force and can hold both circular and square shaped stakes. The linear actuator is housed inside the linear actuator case that is designed to fit on the stake driving arms and may be made for example from a 3D nylon GF material. FIG. 13(a) includes a double-headed arrow (in a vertical position) representing that the stake driving arm moves the attachment up and down. Depending on the attachment, the arm is either driving the stake into the bed plot or pulling the stake out of the bed plot. Shown in FIG. 13(a), the stake driving attachment is shown as an example of where the stake will be positioned under the actuator and driven into the bed plot. In embodiments having both stake driving and stake pulling attachments, the arms on which they are selectively mounted may be understood as comprising stake handling arms.

FIGS. 14(a) and 14(b) illustrate respective front and back isometric views focused on a stake pulling attachment portion for use such as with the exemplary embodiment of FIG. 3(a). FIG. 14(c) illustrates a cross-section view focused on a stake pulling attachment portion as shown in FIGS. 14(a) and 14(b), for use such as with the exemplary embodiment of FIG. 3(a).

The stake pulling attachment is similar to the driving attachment in that both use the same linear actuator. However, for the pulling attachment, the linear actuator will extract all the way before being lowered over top of the stake; then, it will retract, causing an upward force that will pull the stake out of the bed plot.

As represented in FIG. 14(c), the mechanism that grabs the stake is shown. This is part of the attachment which can be easily swapped from the linear actuator. The grippers or grabbers are a special type of grabber outlined in rubber material that when pulled upward (per the arrows in FIG. 14(c)), the friction of the rubber on the stake will cause them to pull downward. This will cause the grabbers to grab the stake harder the harder you lift. This means the more resistance you have against the grippers or grabbers from the stake, the stronger the grip force becomes. Finally, to release the stake, electric magnets will engage which will pull the grippers/grabbers upward, releasing the stake from the mechanism.

Figure 15A:
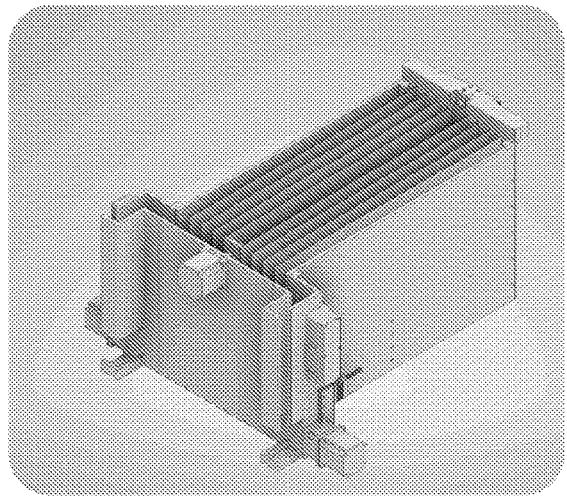
FIGS. 15(a) and 15(b) illustrate respective front and back isometric views focused on a stake holster portion of the exemplary embodiment of FIG. 3(a)
Figure 15B:
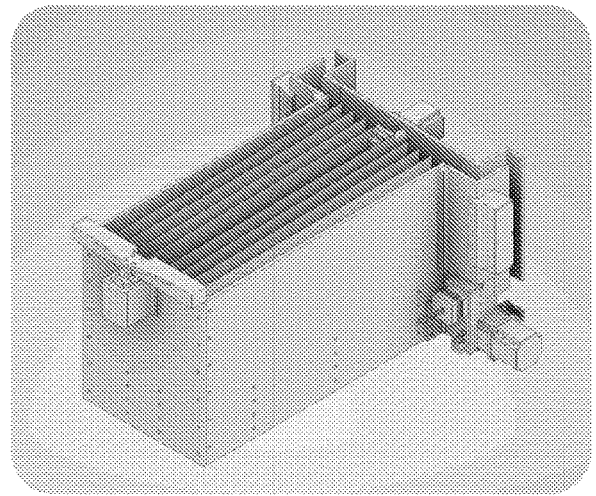
Figure 15C:
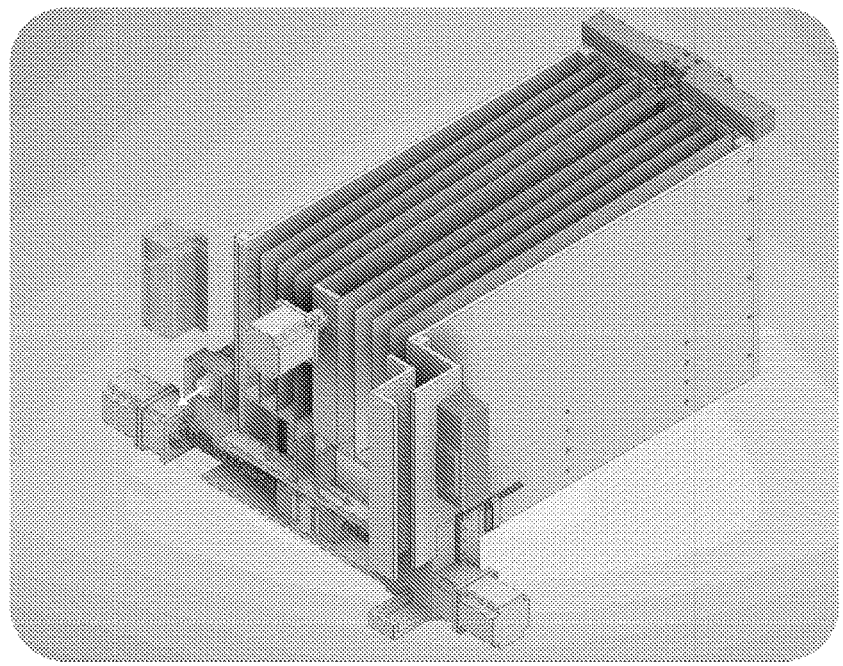
FIG. 15(c) illustrates an isometric view of the exemplary stake holster portion of the exemplary embodiment of FIG. 3(a), and further representing functionality thereof as illustrated by added arrow illustrations.

FIGS. 15(a) and 15(b) illustrate respective front and back isometric views focused on a stake holster portion of the exemplary embodiment of FIG. 3(a). FIG. 15(c) illustrates an isometric view of the exemplary stake holster portion of the exemplary embodiment of FIG. 3(a), and further representing functionality thereof as illustrated by added arrow illustrations.

The robotic device's stake holster is responsible for holding and feeding stakes to the stake driving arms. The holster may be variously designed and sized to hold for example around 200 to 250 stakes. The holster operates in effect as a stand-alone system that constantly feeds stakes to a retrieval point. The holster can communicate to the robotic device's main electrical systems where it can monitor if a stake is loaded or if the holster is empty.

As represented by FIG. 15(c) and the various arrows represented therein, the upper right shaded arm moves a row of stakes into the front of the holster (towards the left in such FIG.). Then the movers at the base of the upright-positioned stakes push (double-headed arrow) the stakes towards the lateral sensors. Then, the recessed plunger (on each respective side) pushes the stake into the pickup location where a stake driving arm can come by and grab the stake.

The robotic device's holster's side walls may be made from acrylic. The various movers, sensor cases, and motor mounts are preferably specialized shapes which made be made from various materials, including for example made from 3D printed nylon GF. The top-mounted mover works similar to an electrical linear actuator where a stepper motor drives the mover towards the front, keeping the stakes tight against the front side wall. The lower movers are also similar in design to an electrical linear actuator, and they push the stakes towards the lateral sensors. Such sensors may comprise for example limit switches that when pressed, signal to the control unit that a stake is in place, at which time the recessed plunger pushes and holds the stake against the outside slot, allowing the stake driving arms to come by and grab the stakes. The recessed plunger is controlled by a stepper motor where the lead screw can travel through the motor where a plunger is fixed to the end and can push the stake into place.

Figure 16A:
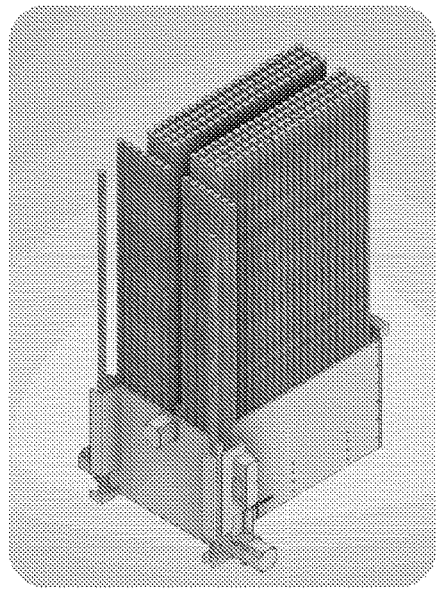
FIGS. 16(a) and 16(b) respectively illustrate front isometric and top elevation views of the stake holster portion as shown in FIGS. 15(a) and 15(b), for use such as with the exemplary embodiment of FIG. 3(a), and further illustrating such holster fully loaded per presently disclosed subject matter with representative stakes.
Figure 16B:
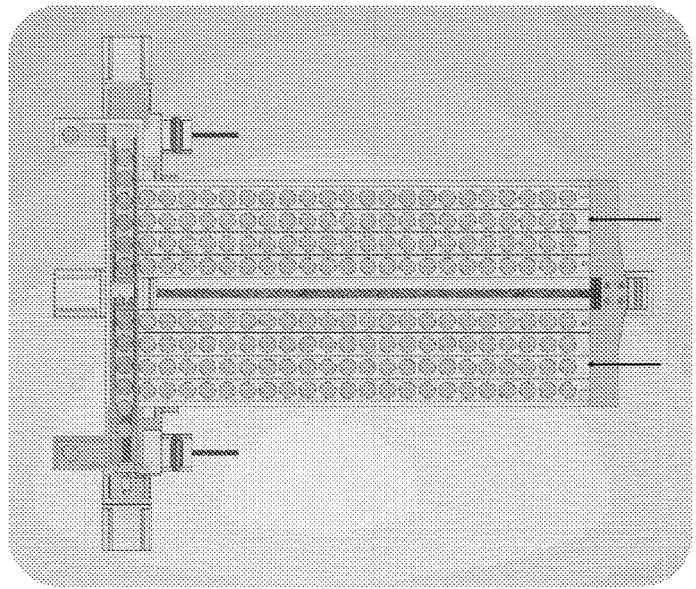
Figure 16C:
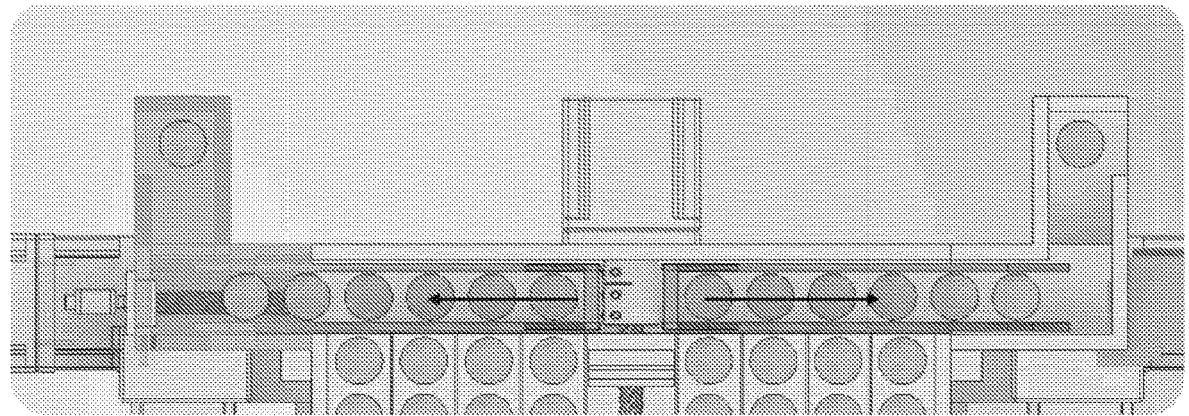
FIG. 16(c) illustrates an enlarged, focused view of a portion of the top elevation view of the stake holster portion as shown in FIG. 16(b), for use such as with the exemplary embodiment of FIG. 3(a), and further illustrating its use with representative stakes.

FIGS. 16(a) and 16(b) respectively illustrate front isometric and top elevation views of the stake holster portion as shown in FIGS. 15(a) and 15(b), for use such as with the exemplary embodiment of FIG. 3(a). Such FIGS. 16(a) and 16(b) further illustrate such holster fully loaded per presently disclosed subject matter with representative stakes. Such stakes may be round or square, and of various lengths and/or materials although wooden stakes may be used. FIG. 16(c) illustrates an enlarged, focused view of a portion of the top elevation view of the stake holster portion as shown in FIG. 16(b), for use such as with the exemplary embodiment of FIG. 3(a), and further illustrating its use with representative stakes.

Figure 16D:
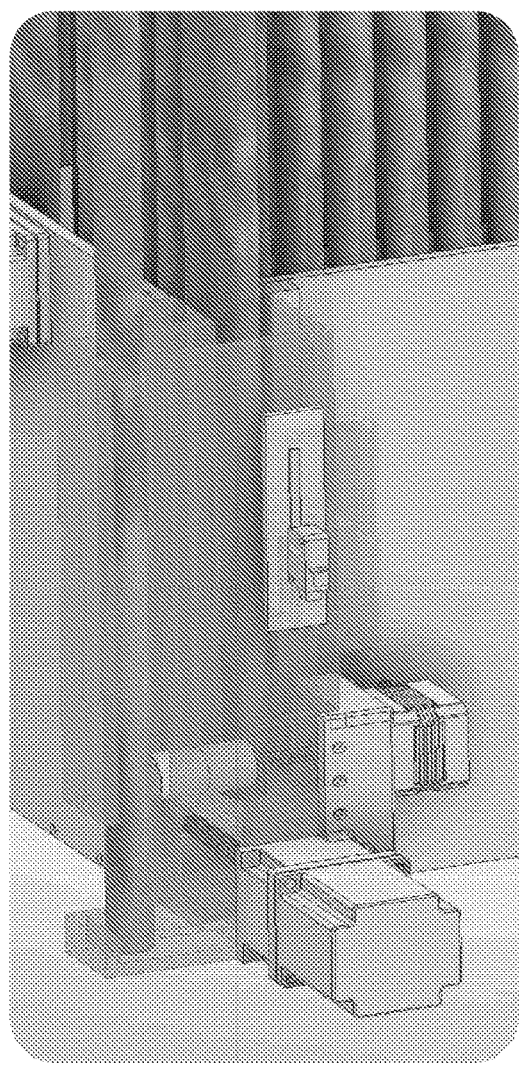
FIG. 16(d) illustrates an enlarged, focused view of a portion of the front isometric view of the stake holster portion as shown in FIG. 16(a), for use such as with the exemplary embodiment of FIG. 3(a), and further illustrating its use with representative stakes.
Figure 16E:
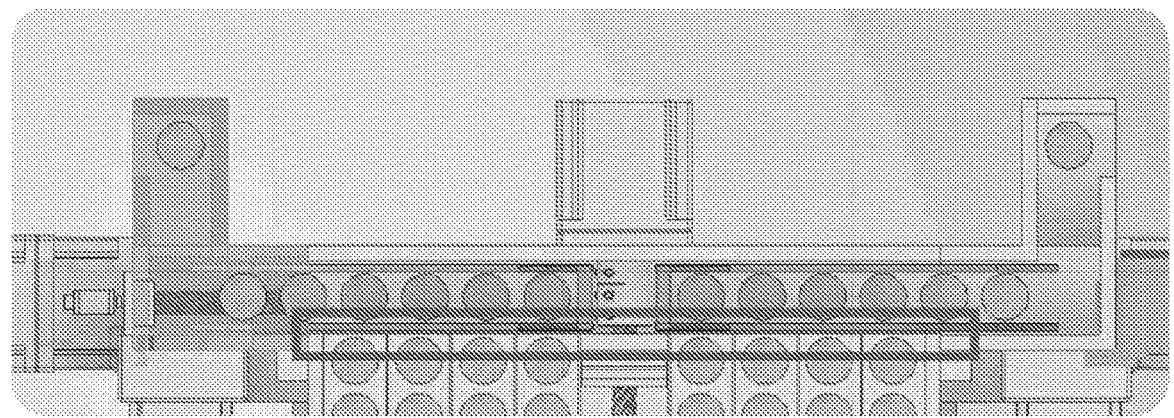
FIG. 16(e) illustrates an enlarged, focused view of a portion of the top elevation view of the stake holster portion as shown in FIG. 16(b), for use such as with the exemplary embodiment of FIG. 3(a), and further illustrating its use with representative stakes.

FIG. 16(d) illustrates an enlarged, focused view of a portion of the front isometric view of the stake holster portion as shown in FIG. 16(a), for use such as with the exemplary embodiment of FIG. 3(a), and further illustrating its use with representative stakes. FIG. 16(e) illustrates an enlarged, focused view of a portion of the top elevation view of the stake holster portion as shown in FIG. 16(b), for use such as with the exemplary embodiment of FIG. 3(a), and further illustrating its use with representative stakes.

For use, the holster is loaded as shown in the FIGS. The stakes preferably fill up the back end of the container and then the topside mover (far right in FIG. 16(b)) moves towards the end of the front wall (far left) keeping the stakes tight against each other. As shown, the stakes are then pushed into a slot in front of the lower movers, and such movers then press the stakes up against the limit switches. The limit switches are how the robotic device knows if a stake is positioned in front of the recessed plunger. Once the slot is emptied, then the lower movers will retract back to their starting point and another row of stakes are pushed into the slot.

FIG. 16(d) shows how the recessed plungers work, designed to push the stakes forward into the exact position required for the robotic device's arms to grab the stakes, and then hold pressure against the stake and the container wall until the arms grab them, after which the plungers release. As represented by FIG. 16(e), preferably an additional element (such as a bristle-like barrier) to hold the stakes before they might fall into the slots in front of the lower movers. This is so the stakes will not be positioned prematurely. Any structure for accomplishing such feature may be practiced, details of which form no particular part of the present specific disclosure. Similarly, in practice, various additional guide members or surfaces from and around the holster may be practiced, to prevent stakes interfering with each other's movements as they are forwarded to the location for being engaged by the stake grab feature. Such variations may be particularly pronounced as different types and sizes of stakes are used, wherefore details of all such particular features form no specific part of the present disclosure, which instead more broadly relates to the feature of guiding the stakes so that they do not interfere with each other's intended travel paths.

Figure 17A:
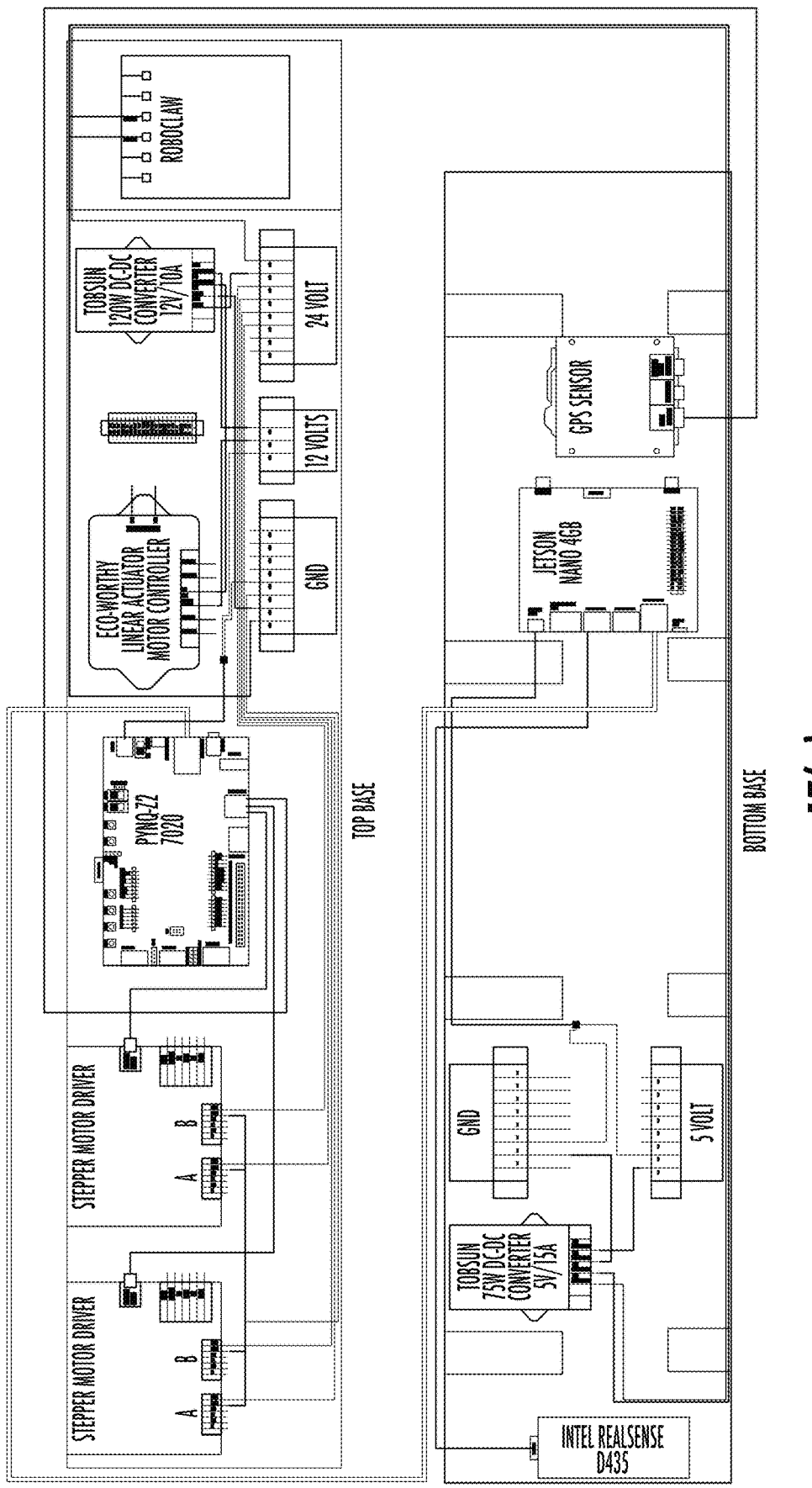
FIG. 17(a) illustrates a schematic view of exemplary wiring diagram and electrical component features of the exemplary embodiment of FIG. 3(a)
Figure 17B:
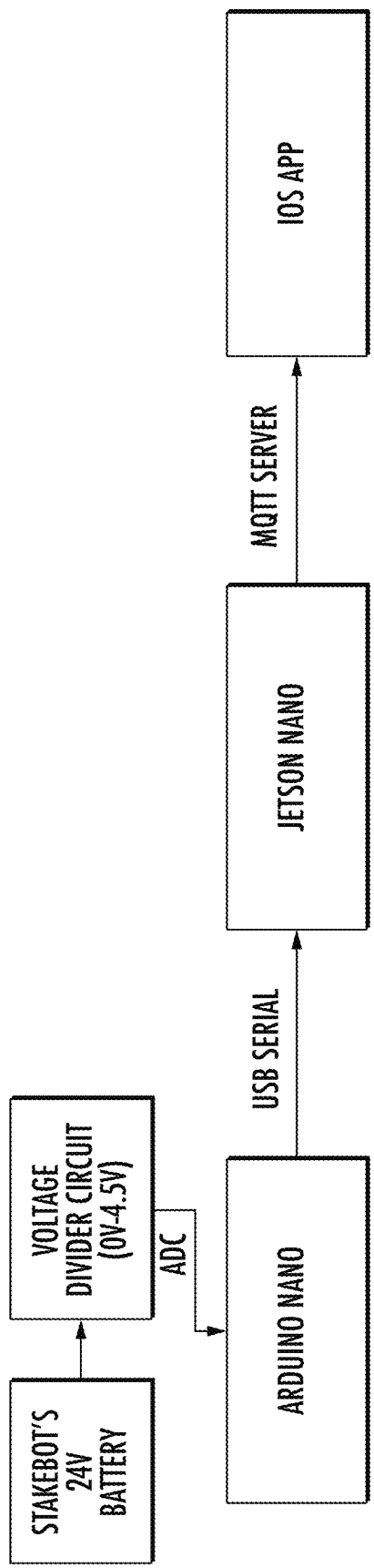
FIG. 17(b) illustrates a block diagram schematic view of exemplary Battery State of Charge (SOC) Communication Flow features of the exemplary embodiment of FIG. 3(a)

FIG. 17(a) illustrates a schematic view of exemplary wiring diagram and electrical component features of the exemplary embodiment of FIG. 3(a). FIG. 17(b) illustrates a block diagram schematic view of exemplary Battery State of Charge (SOC) Communication Flow features of the exemplary embodiment of FIG. 3(a). As otherwise referenced herein, the robotic device's control system includes a variety of different sensors and controllers that communicate to a central computer that is responsible for determining the decisions of the robotic device. When such control is embodied as AI, it is such AI that allows the robotic device to act autonomously and is how the robotic device is capable of maneuvering through the bed plots while driving or retrieving stakes without human interaction. The components that make up this system are the GPS sensor, lidar camera, stepper motor drivers for controlling the actuators, DC motor controller for controlling the robotic device's drive wheels and finally, two microprocessors. One may be a small, powerful computer that allows running multiple neural networks in parallel (such as a Jetson Nano) and the PYNQ FPGA board (an open-source framework that enables embedded programmers to program with Python). Such hardware can handle most of the post processing and AI capabilities, as will be understood by those of ordinary skill in the art without further detailed description.

Figure 18:
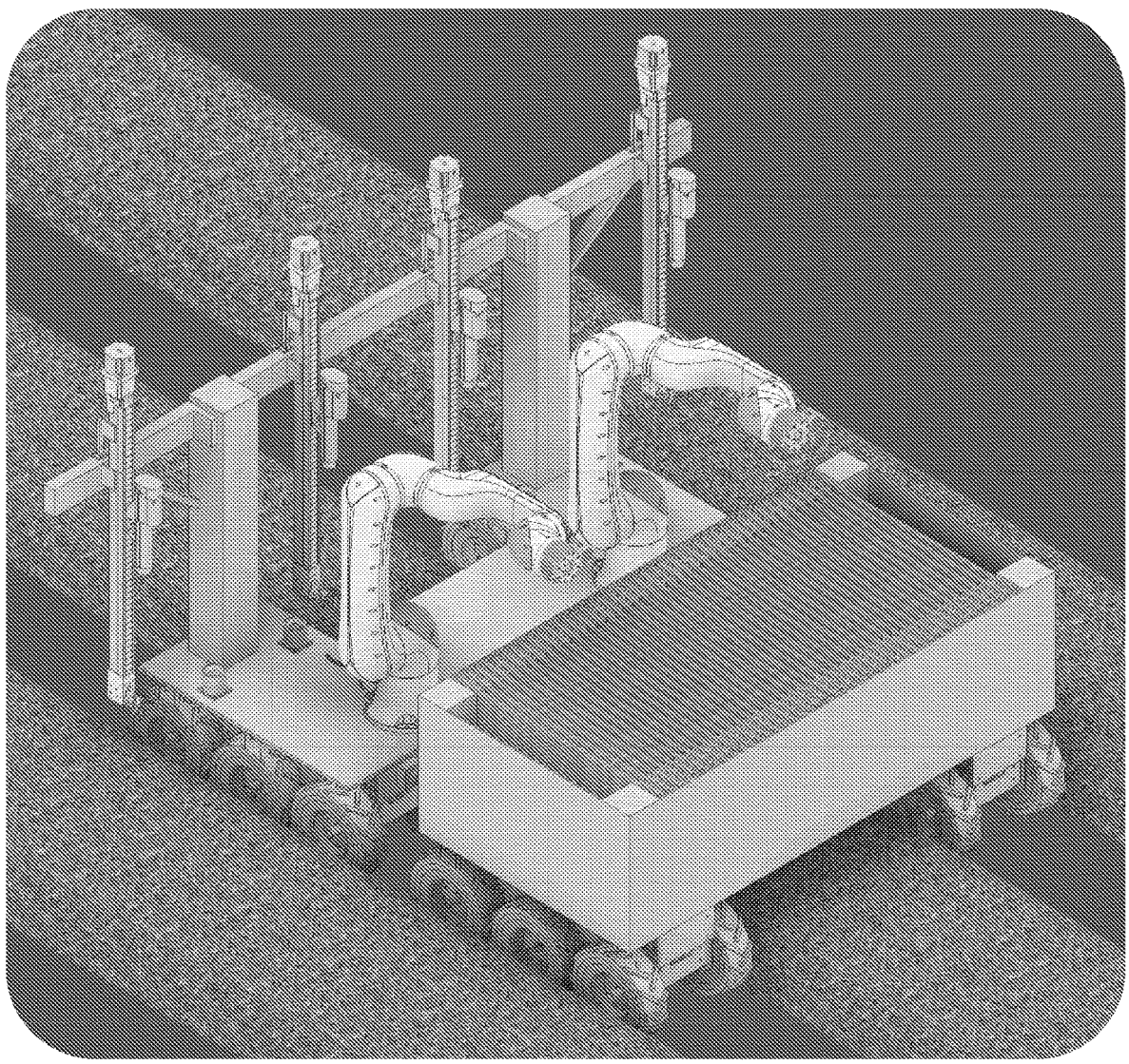
FIG. 18 illustrates an isometric view of another exemplary embodiment of presently disclosed subject matter, having four stake driving arms.

FIG. 18 illustrates an isometric view of another exemplary embodiment of presently disclosed subject matter, having four stake driving arms. The broader concepts of the presently disclosed robotic device can be expanded upon for users with a higher demand or need for staking. The alternative embodiment of FIG. 18 is an autonomous stake driving robot with the same concept of the earlier embodiments but with the ability to drive more stakes per area. The stake driving arms from the earlier embodiments are used here in conjunction with a change that two robotic arms are used to grab the stakes from a trailer and load them for the stake driving arms to drive into the bed plots. Such expanded concept embodiment would still preferably use the same technology and concepts of the earlier embodiments for driving and retrieving the stakes.

While certain embodiments of the disclosed subject matter have been described using specific terms, such description is for illustrative purposes only, and it is to be understood that changes and variations may be made without departing from the spirit or scope of the subject matter.

What is claimed is:

1. An autonomous all-terrain robot for agricultural industries for installing support stakes inground on plant beds, comprising:
   a base having a plurality of drive wheels for controlled movement of the robot;
   a main arm mounted on said base and comprising a generally vertical mast with a pair of side arms laterally projecting from the vertical mast in generally opposite directions of each other;
   a pair of stake driving arms respectively mounted on said side arms for respectively receiving a stake and controllably driving the received stake into the ground; and
   a reservoir associated with said base for receiving and storing a supply of stakes;
   wherein the side arms include a selectively positioned mount for receiving a respective stake driving arm and for selectively positioning each of the stake driving arms a determined distance from the vertical mast.

2. An autonomous all-terrain robot according to claim 1, further comprising a control system for said robot comprising one or more processors programmed for controlling operation of the drive wheels, the side arms, and the stake driving arms of the robot in order to self-navigate the robot and drive stakes into the ground in selected locations.

3. An autonomous all-terrain robot according to claim 2, wherein the stake driving arms include respective gripper hands for controllably grasping a stake from the reservoir and holding the stake until it is driven into the ground.

4. An autonomous all-terrain robot according to claim 3, wherein the reservoir includes at least one pusher operative with storage channels for controllably moving stored stakes into a retrieval point for being grasped by the gripper hands.

5. An autonomous all-terrain robot according to claim 4, wherein the one or more processors are further programmed for controlling operation of the at least one pusher and the gripper hands for supplying stored stakes to the gripper hands.

6. An autonomous all-terrain robot according to claim 5, wherein the one or more processors are further programmed for controlling operation of the drive wheels and the stake driving arms of the robot so that stakes in the gripper hands are positioned in a desired location along an area of plant beds and driven into the ground by the stake driving arms.

7. An autonomous all-terrain robot according to claim 6, wherein the one or more processors are further programmed for controlling operation of the drive wheels and the stake driving arms of the robot so that the robot is navigated to a precise location along an area of plant beds and the stakes in the gripper hands are driven into the ground at a precise depth.

8. An autonomous all-terrain robot according to claim 6, wherein the one or more processors are further programmed for controlling operation of the respective mounts of the side arms for selectively positioning the stake driving arms a respective distance from the vertical mast, so that stakes are driven into the ground by the pair of stake driving arms at a precise separation from each other.

9. An autonomous all-terrain robot according to claim 1, further comprising:
 a second base having a plurality of drive wheels for controlled movement of the robot, and a main arm with a second pair of side arms and second pair of stake driving arms; and
 at least one robotic arm for controllably handling stakes;
 wherein said reservoir comprises a trailer attached to and pulled by the bases, and
 the one or more processors are further programmed for controlling operation of the bases, the side arms, the stake driving arms, and the robotic arm of the robot, so that the robot is autonomously positioned into a desired location along an area of plant beds, and stakes are moved by the robotic arm from the reservoir to the stake driving arms and driven into the ground.

10. Methodology for an autonomous all-terrain robot for agricultural industries for installing support stakes inground on plant beds, comprising:
 providing:
  a base having a plurality of drive wheels for controlled movement of the robot,
  a main arm mounted on said base and comprising a generally vertical mast with a pair of side arms laterally projecting from the vertical mast in generally opposite directions of each other,
  a pair of stake driving arms respectively mounted on said side arms for respectively receiving a stake and controllably driving the received stake into the ground, and
  a reservoir associated with the base for receiving and storing a supply of stakes;
 operating the base to locate the robot in a desired location in an area of plant beds;
 operating the stake driving arms to obtain stakes from the reservoir;
 operating the side arms to selectively position each respective stake driving arm a determined distance from the vertical mast; and
 further operating the stake driving arms to drive the stakes into the ground.

11. Methodology according to claim 10, further comprising a control system for said robot comprising one or more processors programmed for controlling operation of the drive wheels, the side arms, and the stake driving arms of the robot in order to self-navigate the robot and drive stakes into the ground in selected locations.

12. Methodology according to claim 11, wherein the stake driving arms include respective gripper hands for controllably grasping a stake from the reservoir and holding the stake until it is driven into the ground.

13. Methodology according to claim 12, further including controllably moving stored stakes into a retrieval point for being grasped by the gripper hands.

14. Methodology according to claim 10, further including navigating the robot to a precise location along an area of plant beds and driving stakes into the ground at a precise depth.

15. Methodology according to claim 14, further including selectively positioning the stake driving arms a respective distance from the vertical mast, so that stakes are driven into the ground by the pair of stake driving arms at a precise separation from each other.

16. Methodology according to claim 10, further comprising:
 a second base having a plurality of drive wheels for controlled movement of the robot, and a main arm with a second pair of side arms and second pair of stake driving arms;
 at least one robotic arm for controllably handling stakes;
 autonomously positioning the robot into a desired location along an area of plant beds; and
 using the robotic arm to move stakes from the reservoir to the stake driving arms and drive the stakes into the ground.

17. Methodology according to claim 16, wherein said reservoir comprises a trailer attached to and pulled by the bases.

18. An autonomous all-terrain robot for agricultural industries for selectively installing or removing support stakes inground along plant beds while self-navigating the plant beds, comprising:
 a base having a plurality of drive wheels for controlled movement of the robot;
 a main arm, mounted on said base, comprising:
  a vertical mast, and
  a pair of side arms laterally projecting in opposite directions from the vertical mast;
 a pair of stake handling arms respectively mounted on said side arms for respectively and controllably handling a stake relative to the ground;
 a stake holster associated with said base for receiving and storing a supply of stakes in respective storage channels thereof;
 a pair of movable mounts associated with each respective side arm for receiving a respective stake handling arm and for selectively positioning each of the stake handling arms a determined distance from the vertical mast; and
 a control system for said robot comprising one or more processors programmed for controlling operation of the base, the side arms, the movable mounts, and the stake handling arms of the robot in order to:

self-navigate the robot, and
either of (a) drive stakes into the ground or (b) pull stakes from the ground at selected locations.

19. An autonomous all-terrain robot according to claim 18, further comprising a pair of stake driving arm attachments associated respectively with the stake handling arms, and including respective gripper hands for controllably grasping a stake from the stake holster and holding the stake until it is driven into the ground by a stake driving arm attachment.

20. An autonomous all-terrain robot according to claim 19, wherein:
the stake holster includes a plurality of movable surfaces; and
the one or more processors are further programmed for controlling operation of the movable surfaces for controllably moving stored stakes into a retrieval point for being grasped by the gripper hands.

21. An autonomous all-terrain robot according to claim 20, wherein the one or more processors are further programmed for controlling operation of the drive wheels, the movable mounts, and the stake driving arm attachments of the robot so that:
the robot is navigated to a precise location along an area of plant beds,
the respective movable mounts of the side arms selectively position the stake driving arm attachments a respective distance from the vertical mast, and
the stakes in the gripper hands are driven into the ground at a precise depth and at a precise separation from each other.

22. An autonomous all-terrain robot according to claim 18, further comprising:
a second base having a plurality of drive wheels for controlled movement of the robot, and a main arm with a second pair of side arms and second pair of stake driving arms; and
at least one robotic arm for controllably handling stakes;
wherein the one or more processors are further programmed for controlling operation of the bases, the side arms, the stake driving arms, and the robotic arm of the robot, so that the robot is autonomously positioned into a desired location along an area of plant beds, and stakes are moved by the robotic arm from the reservoir to the stake driving arms and driven into the ground.

23. An autonomous all-terrain robot according to claim 18, further comprising a pair of stake pulling arm attachments, associated respectively with the stake handling arms, and including respective grabbers for controllably grasping a stake in the ground and holding the stake until it is pulled from the ground by the stake pulling arm attachment.

24. An autonomous all-terrain robot according to claim 23, wherein:
the stake pulling arm attachment grabbers includes a controllable release; and
the one or more processors are further programmed for controlling operation of the release for controllably releasing from the stake pulling arm attachments stakes pulled from the ground, and for storing the released stakes in the stake holster.

25. An autonomous all-terrain robot according to claim 23, wherein the one or more processors are further programmed for controlling operation of the drive wheels, the movable mounts, and the stake pulling arm attachments of the robot so that:
the robot is navigated to a precise location along an area of plant beds, so that the respective grabbers of the stake pulling arm attachments are selectively positioned at a precise location where stakes are residing in the ground; and
stakes in the ground are pulled from the ground.

* * * * *